United States Patent
Hussein et al.

(10) Patent No.: US 6,654,262 B2
(45) Date of Patent: Nov. 25, 2003

(54) INVERTER WITH PRE-CHARGING CAPACITOR TO REDUCE INRUSH CURRENT

(75) Inventors: Khalid Hassan Hussein, Fukuoka (JP); Kazuaki Hiyama, Fukuoka (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 4 days.

(21) Appl. No.: 10/181,883
(22) PCT Filed: Nov. 30, 2000
(86) PCT No.: PCT/JP00/08491
§ 371 (c)(1), (2), (4) Date: Jul. 24, 2002
(87) PCT Pub. No.: WO02/45250
PCT Pub. Date: Jun. 6, 2002

(65) Prior Publication Data
US 2003/0002298 A1 Jan. 2, 2003

(51) Int. Cl.[7] .................................................. H02H 7/10
(52) U.S. Cl. .......................................... 363/49; 388/903
(58) Field of Search ........................... 363/49; 388/903; 323/908; 361/18, 23; 327/393

(56) References Cited

U.S. PATENT DOCUMENTS 5,179,842 A   1/1993  Kanazawa
5,627,738 A * 5/1997  Lubomirsky et al. ......... 363/49
5,706,189 A   1/1998  Majumdar et al.

FOREIGN PATENT DOCUMENTS

| JP | 6-115836 | 4/1994 |
| JP | 07 312876 | 11/1995 |
| WO | 00 41293 | 7/2000 |

* cited by examiner

*Primary Examiner*—Shawn Riley
(74) *Attorney, Agent, or Firm*—Oblon, Spivak, McClelland, Maier & Neustadt, P.C.

(57) ABSTRACT

A power conversion device that limits an inrush current while reducing overall weight and volume of the device even under a high rated power. One and the other ends of an initial charging circuit having a DC power source, a switch, and a diode connected in series are connected to an inductive load and a lower potential source line, respectively in a power conversion device. The initial charge controller unit turns ON and OFF one switching element of the power conversion device repeatedly during an initial charging operation prior to the normal operation. As a result, a charging current flowing through the initial charging circuit is supplied to a capacitor through the inductive load repeatedly. After the capacitor is sufficiently charged, the initial charging operation is finished and the normal operation is started.

20 Claims, 15 Drawing Sheets

INVERTER WITH PRE-CHARGING CAPACITOR TO REDUCE INRUSH CURRENT

TECHNICAL FIELD

The present invention relates to a power conversion device; in particular, relates to an improvement thereof to limit an inrush current while reducing overall weight and volume of the device even under a high rated power.

BACKGROUND ART

FIG. 16 is a circuit diagram showing a structure of a conventional power conversion device (which will be hereinafter referred to as "first prior art") having an inrush current limiting circuit. This power conversion device 451 comprises an inverter 5, a capacitor 12, a main power source 10, switches 11, 11a, and a resistor 11b. The power conversion device 451 is utilized by connecting a three-phase inductive load 50, such as a motor, to output terminals U, V and W of the power conversion device 451.

The main power source 10 supplies source input terminals P, N of the inverter 5 with a DC (i.e. direct current) main power source voltage $V_{DC1}$. The capacitor 12 is connected to the source input terminals P, N, and thereby functions to hold a DC voltage supplied to the inverter 5 at a constant level by means of its capacitance $C_{DC}$. The switch 11, structured as a relay, functions as a main switch that turns ON when power supply to the inductive load 5 is started and turns OFF when stopped.

The switch 11a and the resistor 11b are interposed between the main power source 10 and the capacitor 12 so as to limit an inrush current which flows to charge the capacitor 12 immediately after the switch 11 turns on. After the switch 11 turns ON to start the inverter 5, the switch 11a remains OFF until charging of the capacitor 12 is almost completed. Accordingly, the inrush current is limited by the resistor 11b.

When the charged voltage across the capacitor 12 almost reaches the main power source voltage $V_{DC1}$, the switch 11a turns on. Thereafter, the inverter 5 starts its normal operation. Thus, a DC current is supplied to the inverter 5 by the main power source 10 with little loss, during the normal operation of the inverter 5.

However, since a large current supplied by the main power source 10 flows through the switch 11a and the resistor 11b, the switch 11a and the resistor 11b are required to have a high rated power, as well as the switch 11 as the main switch. In the power conversion device 451, therefore, it has been a problem that overall weight and volume of the device are large and a manufacturing cost thereof is high.

Further, since the switch 11 and the switch 11a (in particular, the switch 11) have to operate mechanically while a high voltage being applied, the reliability and durability thereof have been problematic. In particular, arcing is influential to the reliability and durability. Moreover, conduction losses of both the switch 11 and the switch 11a during the normal operation of the inverter 5 have also been not negligible concerns.

FIG. 17 is a circuit diagram showing a structure of another conventional power conversion device (which will be hereinafter referred to as "second prior art") having an inrush current limiting circuit. This power conversion device 452 is characteristically different from the power conversion device 451 according to the first prior art in that an NTC (negative, coefficient thermistor) 11c is interposed between the main power source 10 and the capacitor 12 in place of the switch 11a and the resistor 11b.

Usually when starting the inverter 5, since the NTC 11c is low in temperature, it has high resistance. The inrush current flowing after the switch 11 turns ON is, therefore, limited by high resistance of the NTC 11c. The temperature of the NTC 11c rapidly rises up due to loss heat generated in the NTC 11c. Accordingly, the resistance of the NTC 11c rapidly decreases, which decreases loss in the NTC 11c.

The loss generated in the NTC 11c during the operation of the inverter 5 is, however, not negligible, and therefore, the power conversion device 452 has been disadvantageously applicable only to devices having a low rated power (e.g. few kW or less). Further, if the inverter 5 starts operation before the NTC 11c has sufficiently been cooled down, e.g. the inverter 5 restarts immediately after it stopped, the NTC 11c does not sufficiently function as an inrush current limiter, which has also degraded the reliability of the device.

FIG. 18 is a circuit diagram showing a structure of still another conventional power conversion device (which will be hereinafter referred to as "third prior art") having an inrush current limiting circuit. This power conversion device 453 is disclosed in Japanese Patent Application Laid-Open No. 6-115836 (1994), and is characteristically different from any one of the power conversion devices 451 and 452 in that an initial charging circuit for charging the capacitor 12 is connected to the capacitor 12 in parallel.

The initial charging circuit comprises a reactor 11d, a switching element 11e, a DC power source 11f, a controller unit 11g, a resistor 11h, a base drive circuit 11j and a diode 11k. When the inverter 5 is started, the switch 11 is initially set OFF. During this period, the switching element 11e repeatedly turns ON and OFF due to the function of the controller unit 11g. As a result, a current is repeatedly charged into and discharged from the reactor 11d, and the discharged current is repeatedly supplied to the capacitor 12. Thus, the initial charging circuit functions as such a charge-pumping circuit as to charge up the capacitor 12. After the capacitor 12 almost completes charging, the initial charging circuit stops its operation and the switch 11 turns on. Thereafter, the inverter 5 starts the normal operation.

The power conversion device 453 is advantageously applicable to devices having a high rated power, and does advantageously not require any of the switch 11a and the resistor 11b for limiting the inrush current (see FIG. 16). However, the power conversion device 453 needs the reactor 11d and the switching element 11e, which is a power element, and therefore, the power conversion device 453 has been posing a problem in that overall weight and volume are large and a manufacturing cost is high, similarly to the power conversion device 451.

DISCLOSURE OF INVENTION

Accordingly, it is an object of the present invention to obtain a power conversion device which eliminates the above mentioned problems and limits an inrush current while reducing overall weight and volume of the device even under a high rated power.

In order to achieve the object, a first aspect of the present invention is directed to a power conversion device. The power conversion device comprises: a first switching element, one main electrode thereof being connected to a first source line; a first freewheeling diode connected to the first switching element in inverse-parallel; a second switching element, one main electrode thereof being connected to other main electrode of the first switching element, and other main electrode thereof being connected to a second source line; a second freewheeling diode connected to the second switching element in inverse-parallel; a third switching element, one main electrode thereof being connected to the first source line; a third freewheeling diode connected to the third switching element in inverse-parallel; a fourth switching element, one main electrode thereof being connected to other main electrode of the third switching element, and other main electrode thereof being connected to the second source line; a fourth freewheeling diode connected to the fourth switching element in inverse-parallel; a capacitor, one end and other end thereof being connected to the first source line and the second source line, respectively; a first switch, one end thereof being connected to one source line of a set of the first source line and the second source line; an initial charging circuit having a DC power source and a second switch connected in series, one end thereof being connected to a connection between the third switching element and the fourth switching element, and other end thereof being connected to the second source line; and an initial charge controller unit controlling the second switch and the second switching element so as to set the second switch ON and repeatedly turn ON and OFF the second switching element while the first switch is set OFF.

According to a second aspect of the present invention, in the power conversion device of the first aspect, the initial charge controller unit controls the second switching element to turn OFF when a charging current which is a current flowing through the initial charging circuit exceeds a first reference current and turn ON when the charging current drops below a second reference current.

According to a third aspect of the present invention, in the power conversion device of the second aspect, the initial charge controller unit controls the first switch and the second switch so as to set the first switch OFF and set the second switch ON when a charged voltage which is a voltage across the capacitor is lower than a reference voltage, and set the first switch ON and the second switch OFF when the charged voltage is higher than the reference voltage.

According to a fourth aspect of the present invention, in the power conversion device of the first aspect, the initial charging circuit further has a diode connected to the DC power source and the second switch in series.

According to a fifth aspect of the present invention, in the power conversion device of the first aspect, the power conversion device further comprises: a rectifier circuit converting an AC voltage input from an exterior into a DC voltage and applying the DC voltage between other source line of the set of the first source line and the second source line and other end of the first switch.

According to a sixth aspect of the present invention, in the power conversion device of the fifth aspect, the DC power source is a converter converting the DC voltage into another DC voltage.

According to a seventh aspect of the present invention, in the power conversion device of the first aspect, the power conversion device further comprises: first to fourth drive circuits respectively connected to control electrodes of the first to fourth switching elements, and respectively driving the first to fourth switching elements in response to first to fourth control signals respectively, wherein the initial charge controller unit -transmits the second control signal to the second drive circuit to thereby control the second switching element.

According to an eighth aspect of the present invention, in the power conversion device of the seventh aspect, source voltages of the second and fourth drive circuits are supplied by the DC power source.

According to a ninth aspect of the present invention, in the power conversion device of the third aspect, the power conversion device further comprises: a charged voltage detection circuit detecting the charged voltage to thereby output a first detection voltage, wherein the initial charge controller unit receives the first detection voltage to thereby control the first switch and the second switch on a basis of the charged voltage.

According to a tenth aspect of the present invention, in the power conversion device of the ninth aspect, the charged voltage detection circuit comprises: a first resistor, one end thereof being connected to the first source line; and a second resistor, one end thereof being connected to other end of the first resistor and other end thereof being connected to the second source line, and outputs a voltage at a connection between the first resistor and the second resistor as the first detection voltage.

According to an eleventh aspect of the present invention, in the power conversion device of the second aspect, the power conversion device further comprises: a charging current detection circuit detecting the charging current to thereby output a second detection voltage, wherein the initial charge controller unit receives the second detection voltage to thereby control the second switching element on a basis of the charging current.

According to a twelfth aspect of the present invention, in the power conversion device of the eleventh aspect, the charging current detection circuit comprises a third resistor interposed into a path of the charging current, and outputs a voltage drop across the third resistor as the second detection voltage.

According to a thirteenth aspect of the present invention, in the power conversion device of the third aspect, the power conversion device further comprises: a charged voltage detection circuit detecting the charged voltage to thereby output a first detection voltage; and a charging current detection circuit detecting the charging current to thereby output a second detection voltage, wherein the initial charge controller unit comprises: an A/D converter converting the first detection voltage and the second detection voltage from analogue form to digital form; a processing unit executing a digital operation processing on a basis of the first and second detection voltages having digital form to thereby calculate a set of signals which control the first switch, the second switch and the second switching element; and a buffer circuit amplifying the set of signals to thereby transmit the same to the first switch, the second switch and the second switching element.

According to a fourteenth aspect of the present invention, in the power conversion device of the third aspect, the processing unit comprises: a CPU operating on a basis of a program; and a memory storing the program, wherein the CPU operates on a basis of the program so as to calculate the set of signals.

According to a fifteenth aspect of the present invention, in the power conversion device of the third aspect, the power conversion device further comprises: a charged voltage detection circuit detecting the charged voltage to thereby output a first detection voltage; and a charging current detection circuit detecting the charging current to thereby output a second detection voltage, wherein the initial charge controller unit comprises: a first operational amplifier of two-input type; and a second operational amplifier of two-input type, wherein the first operational amplifier receives, at two inputs thereof, the first detection voltage and a first reference voltage, and transmits an output signal thereof to the first switch and the second switch so as to set only one of the first switch and the second switch ON, and the second operational amplifier has a positive feedback loop, receives the second detection voltage at a reverse input thereof, receives a second reference voltage at a non-reverse input thereof, and transmits an output signal thereof to the second switching element.

According to a sixteenth aspect of the present invention, in the power conversion device of the fifteenth aspect, the initial charge controller unit further comprises a logic switch, and the logic switch is interposed into a transmission path transmitting the output signal of the second operational amplifier to second switching element, and transmits the output signal of the second operational amplifier to the second switching element only when an output signal of the first operational amplifier is such a value to set the first switch OFF.

According to a seventeenth aspect of the present invention, in the power conversion device of the first aspect, the initial charge controller unit comprises: a CPU operating on a basis of a program; and a memory storing the program, wherein the CPU operates on a basis of the program so as to control the first switch, the second switch and the second switching element.

According to a nineteenth aspect of the present invention, in the power conversion device of the eighteenth aspect, the initial charge controller unit and the main controller unit are integrated into an integrated controller unit which comprises a CPU operating on a basis of a program and a memory storing the program, wherein the CPU operates on a basis of the program so as to perform both a control of the initial charge controller unit and a control of the main controller unit.

According to a twentieth aspect of the present invention, in the power conversion device of the first aspect, the power conversion device further comprises: a fifth switching element, one main electrode thereof being connected to the first source line; a fifth freewheeling diode connected to the fifth switching element in inverse-parallel; a sixth switching element, one main electrode thereof being connected to other main electrode of the fifth switching element, and other main electrode thereof being connected to the second source line; and a sixth freewheeling diode connected to the sixth switching element in inverse-parallel.

In a device according to the first aspect of the present invention, when the device is used, a main power source is connected between the other source line of the set of the first and second source lines and the other end of the first switch, and an inductive load is connected between two connections. One is a connection between the first and second switching elements, and the other is a connection between the third and fourth switching elements. When the first switch is set OFF, i.e. before the normal operation is started, the second switch is set ON and the second switching element repeatedly turns ON and OFF due to operation of the initial charge controller unit. As a result, the initial charge controller unit, the second switching element and an inductance of the inductive load function as a charge-pumping circuit, so that a charging current is repeatedly charged into and discharged from the inductance of the inductive load and the discharged charging current repeatedly charges the capacitor, passing through the first freewheeling diode. If the first switch is turned ON for the normal operation after the capacitor has been sufficiently charged, an inrush current due to turning-ON of the first switch can be suppressed.

Further, since charge-pumping function is utilized, a power resistor and a power switch through which a large current supplied by the main power source flows are removed contrary to the first prior art, and a rated current can be set large contrary to the second prior art. Moreover, since the second switching element and the first freewheeling diode which are indispensable for the normal operation and the inductance of the inductive load are utilized for implementing the charge-pumping function, additional switching element and inductor are not required contrary to the third prior art. Thus, in the device of the first aspect of the present invention, high reliability is achieved even under large rated current, and the overall weight and volume of the device can be reduced.

In a device according to the second aspect of the present invention, the second switching element repeatedly turns ON and OFF so that the charging current flowing through the initial charging circuit remains within a certain range. Accordingly, the capacitor is charged efficiently in a short time.

In a device according to the third aspect of the present invention, the capacitor is charged with the first switch set OFF and the second switch set ON until the charged voltage across the capacitor reaches the reference voltage. When the charged voltage exceeds the reference voltage, the second switch turns OFF so as to isolate the initial charging circuit from the inductive load, and the first switch turns ON so that the first and second source lines are supplied with a DC voltage from the main power source. Thus, charging of the capacitor and subsequent move to the normal operation are performed on the basis of the charged voltage across the capacitor, and therefore, the inrush current is suppressed with high reliability.

In a device according to the fourth aspect of the present invention, since the charging circuit is provided with a diode, the second switch and the DC power source are protected from high voltage being applied.

In a device according to the fifth aspect of the present invention, since the rectifier circuit is provided as a main electrode, the device can be used only by connecting an available AC power source without preparing an external DC power source.

In a device according to the sixth aspect of the present invention, since the DC power source is a converter which utilizes the DC voltage generated by the rectifier circuit, the DC power source is configured simply.

In a device according to the seventh aspect of the present invention, since the drive circuits for driving the switching elements are provided, small signals are satisfactory as the control signals transmitted to easily drive the switching elements having large rated current. Further, the initial charge controller unit controlling the second switching element can be configured simply.

In a device according to the eighth aspect of the present invention, since the second and fourth drive circuits are supplied with source voltage by the DC power source, an additional power source for supplying the second and fourth drive circuits with the source voltages is not required. Accordingly, the overall weight and volume and the manufacturing cost of the device are further reduced, In a device according to the ninth aspect of the present invention, the charged voltage detection circuit is provided, and the detection signal output therefrom is utilized in the initial charge controller unit. The initial charge controller unit can, therefore, process a voltage signal having a value suited for processing, so that the initial charge controller unit can be configured simply.

In a device according to the tenth aspect of the present invention, the charged voltage detection circuit is formed simply of a serial circuit of the first and second resistors, and divided voltage of the charged voltage is output as the first detection voltage. Thus, the first detection voltage proportional to the charged voltage is obtained by a simple configuration. Further, the first detection voltage can easily be adjusted to a value suited for the processing of the initial charge controller unit by adjusting the resistance ratio of the first and second resistors.

In a device according to the eleventh aspect of the present invention, the charging current detection circuit is provided, and the detection signal output therefrom is utilized in the initial charge controller unit. The initial charge controller unit can, therefore, process a voltage signal having a value suited for processing, so that the initial charge controller unit can be configured simply.

In a device according to the twelfth aspect of the present invention, the charging current detection circuit comprises the third resistor interposed into the path of the charging current, and the voltage drop across the third resistor is output as the second detection voltage. Thus, the charging current detection circuit is configured simply.

In a device according to the thirteenth aspect of the present invention, the initial charge controller unit converts the first and second detection voltages into digital signals, and executes the digital operation processing on the basis of the digital signals to thereby perform the control operation. Accordingly, highly precise control operation with little secular change is implemented.

In a device according to the fourteenth aspect of the present invention, the CPU operates on the basis of the program stored in the memory so as to perform the control operation of the initial charge controller unit. The reference voltage, reference current, processing speed and other conditions can, therefore, be adjusted with high accuracy, and it is easy to adjust or modify these conditions. Thus, further precise control operation is implemented, and flexible design change suitable for so-called multi-item small-quantity production is facilitated.

In a device according to the fifteenth aspect of the present invention, the first and second operational amplifiers process the first and second detection voltages so as to perform the control operation of the initial charge controller unit. The initial charge controller unit is, therefore, configured simply and lightly, and the manufacturing cost of the device is reduced.

In a device according to the sixteenth aspect of the present invention, since the initial charge controller unit comprises the logic switch, the output signal of the second operational amplifier stops being stransmitted to the second switching element when the charged voltage has exceeded the reference voltage and the normal operation has been started. The initial charge controller unit, therefore, is prevented from intervening the normal operation of the first to fourth switching elements.

In a device according to the seventeenth aspect of the present invention, the CPU operates on the basis of the program stored in the memory so as to perform the control operation of the initial charge controller unit. The reference voltage, reference current, processing speed and other conditions can, therefore, be adjusted with high accuracy, and it is easy to adjust or modify these conditions. Thus, further precise control operation is implemented, and flexible design change suitable for so-called multi-item small-quantity production is facilitated.

In a device according to the eighteenth aspect of the present invention, since the main controller unit controlling the normal operation of the first to fourth switching elements is provided, it is not required to input signals driving the first to fourth switching elements from the exterior to perform the normal operation.

In a device according to the nineteenth aspect of the present invention, since the CPU operates on the basis of the program stored in the memory so as to perform the control operation of both the initial charge controller unit and the main controller unit. The main controller unit and the initial charge controller unit are configured simply and lightly as a whole, and the manufacturing cost of the device is reduced.

In a device according to the twentieth aspect of the present invention, since the fifth and sixth switching elements and the fifth and sixth freewheeling diodes are provided, a three-phase inductive load can be connected as the inductive load.

These and other objects, features, aspects and advantages of the present invention will become more apparent from the following detailed description of the present invention when taken in conjunction with the accompanying drawings.

BEST MODE FOR CARRYING OUT THE INVENTION

1. First Preferred Embodiment

First, a power conversion device according to the first preferred embodiment of the present invention will be described.

1.1. Outline of Device Structure

Figure 1:
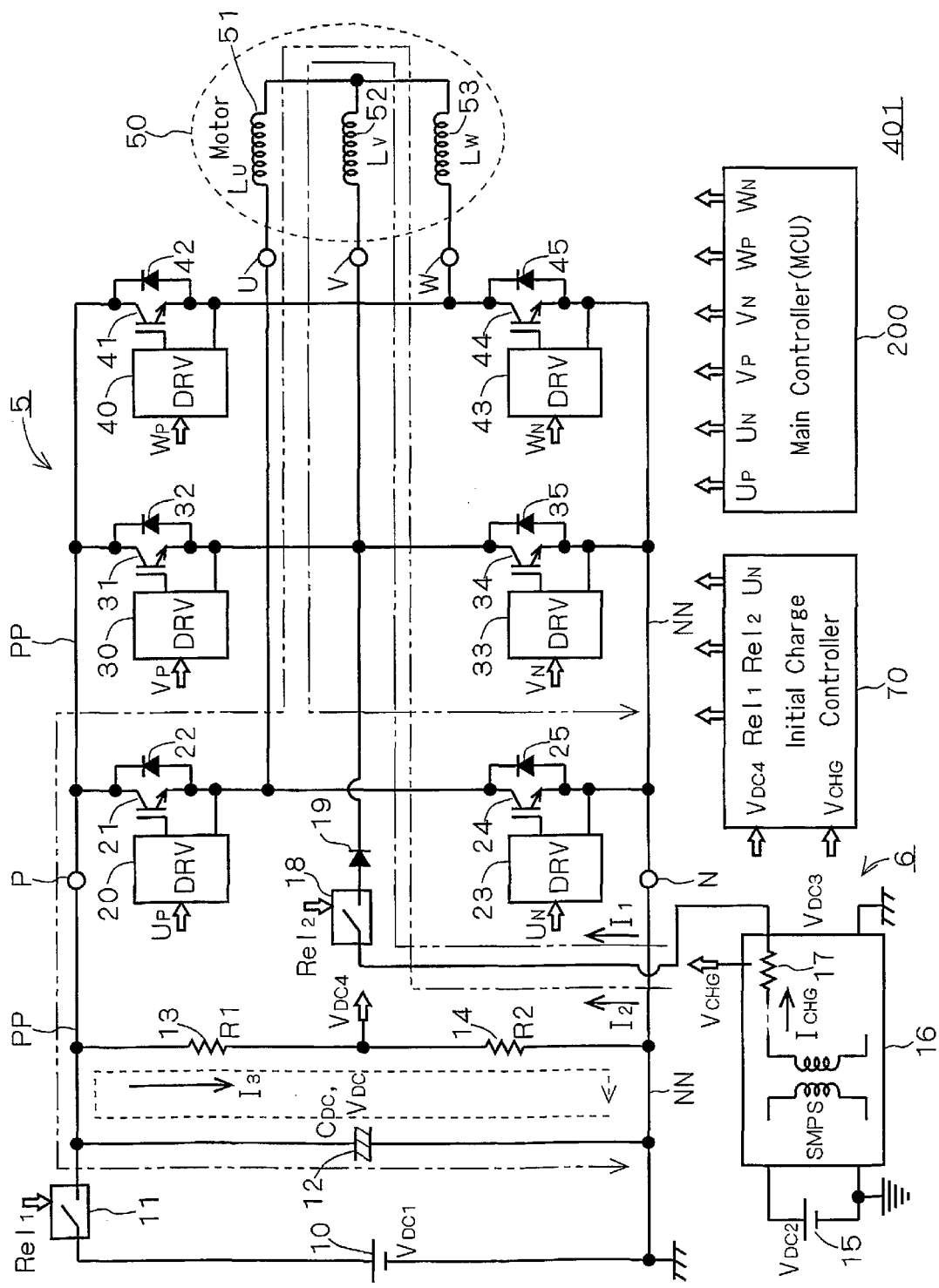
FIG. 1 is a circuit diagram showing a structure of a power conversion device according to a first preferred embodiment of the present invention.
Figure 16:
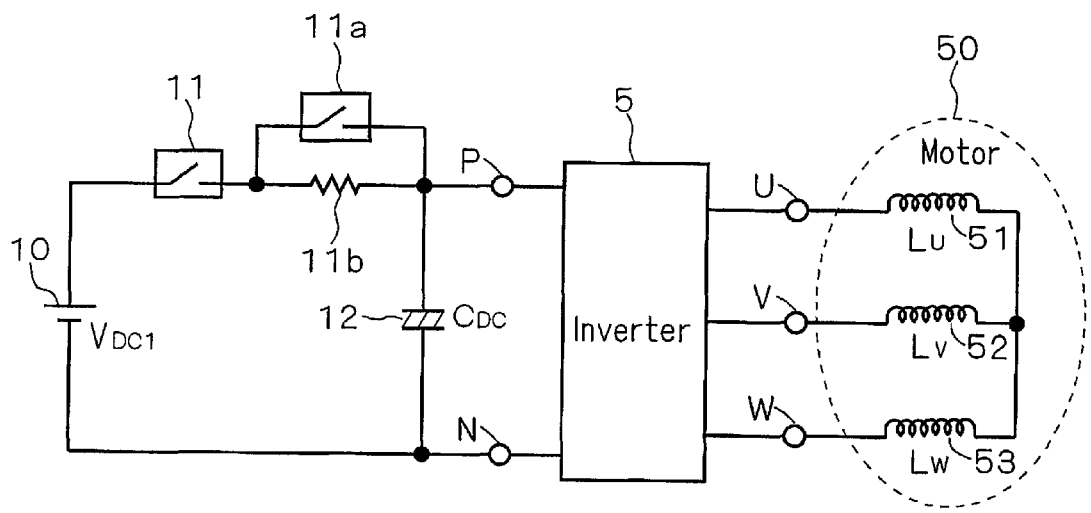
FIG. 16 is a circuit diagram showing a structure of a power conversion device according to the first prior art.
Figure 17:
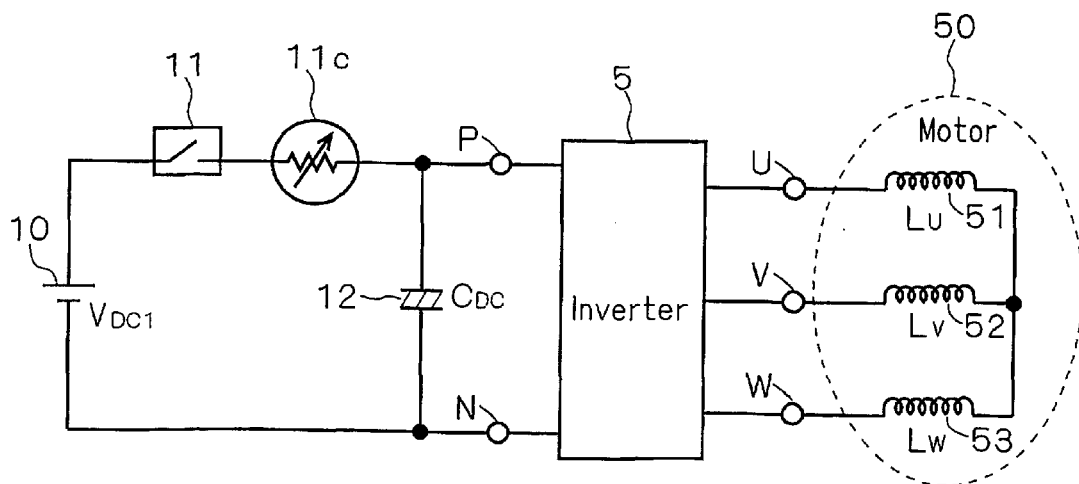
FIG. 17 is a circuit diagram showing a structure of a power conversion device according to the second prior art.
Figure 18:
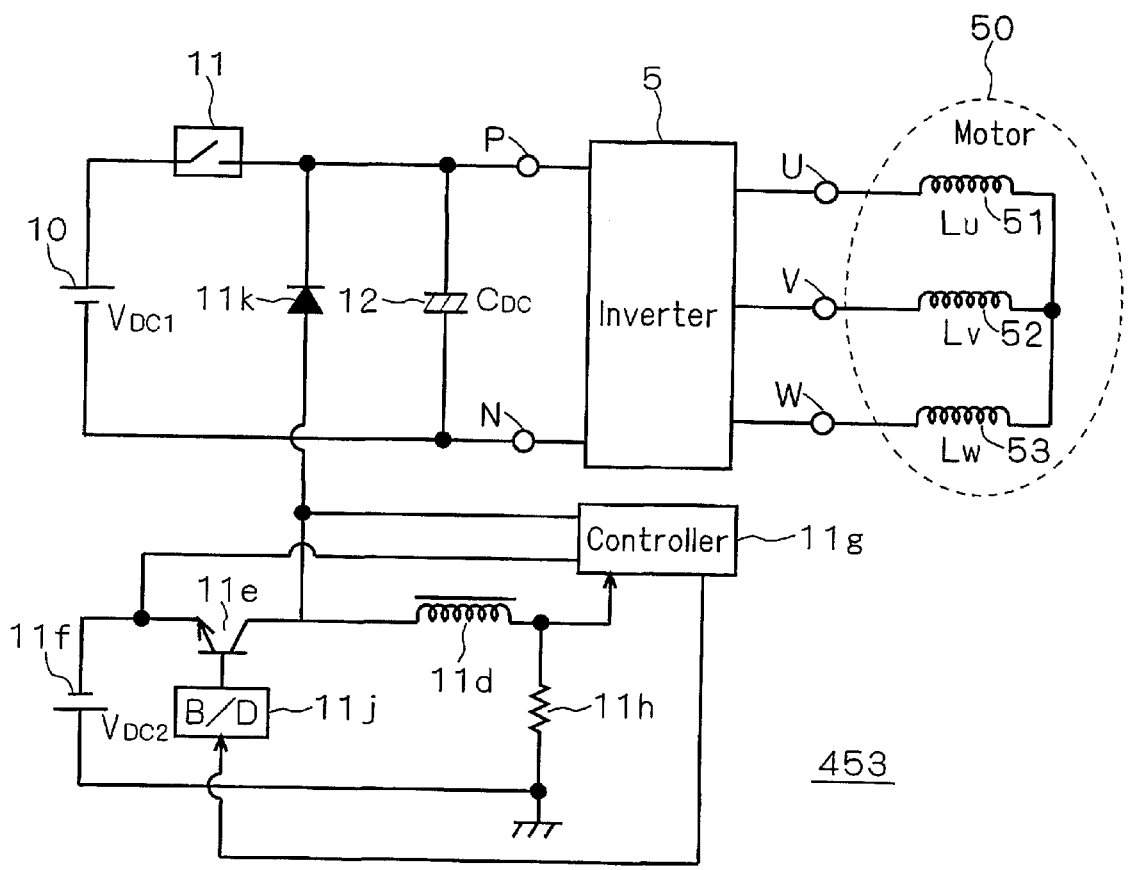
FIG. 18 is a circuit diagram showing a structure of a power conversion device according to the third prior art.

FIG. 1 is a circuit diagram showing a structure of a power conversion device according to the first preferred embodiment of the present invention. In the following figures, the same reference characters are allotted to the same parts or the corresponding parts (i.e. parts having the same functions) as those in the conventional devices shown in FIGS. 16 to 18 so as to make clear the relationship therebetween.

The power conversion device 401 shown in FIG. 1 comprises an inverter 5, a capacitor 12, a main power source 10, a switch 11, an initial charging circuit 6, resistors 13, 14, an initial charge controller unit 70, and a main controller unit 200. The power conversion device 401 is utilized by connecting a three-phase inductive load 50, such as a motor, to output terminals U, V and W of the power conversion device 401. The three-phase inductive load 50 comprises windings 51, 52 and 53 which have inductances $L_U$, $L_V$ and $L_W$, respectively.

When the power conversion device 401 is instructed to start operation from exterior, an initial charging operation is performed at first to charge up the capacitor 12, and thereafter, a normal operation is started. The initial charging operation is performed on the basis of control by the initial charge controller unit 70. The normal operation is performed on the basis of control by the main controller unit 200. The intial operation will be described in detail later.

The inverter 5 comprises switching elements 21, 24, 31, 34, 41 and 44, freewheeling diodes 22, 25, 32, 35, 42 and 45, and drive circuits 20, 23, 30, 33, 40 and 43. Generally, each of the switching elements 21, 24, 31, 34, 41 and 44 is a semiconductor element that controls a main current flowing across the same through a pair of main electrodes in response to a signal input to a control electrode. Preferably, the same is a power switching element e.g. a power IGBT, a power bipolar transistor, and a power MOSFET. Above all, the power IGBT advantageously has low saturation voltage $V_{CE(sat)}$ which is defined as a voltage between the pair of the main electrodes in a conducting (ON) state, and is of voltage control type, which can easily be controlled. Therefore, each of the switching elements 21, 24, 31, 34, 41 and 44 will be supposed to be a power IGBT in the following description.

Collectors of the switching elements 21, 31 and 41 are connected to a higher potential source line PP. Collectors of the switching elements 24, 34 and 44 are connected to emitters of the switching elements 21, 31 and 41, respectively, and emitters are connected to a lower potential source line NN. An output terminal U is connected to a connection between the switching elements 21 and 24. An output terminal V is connected to a connection between the switching elements 31 and 34. An output terminals W is connected to a connection between the switching elements 41 and 44.

Freewheeling diodes 22, 25, 32, 35, 42 and 45 are respectively connected in parallel to the switching elements 21, 24, 31, 34, 41 and 44, in such a direction that a forward current flows through corresponding switching element and diode in circular. In the present specification, it is referred to as "connected in inverse-parallel" that a freewheeling diode is connected to a switching element in such a direction that the forward current flows in circular. The freewheeling diodes 22, 25, 32, 35, 42 and 45 are provided in order to protect the switching elements 21, 24, 31, 34, 41 and 44 from reverse currents, respectively.

The drive circuits 20, 23, 30, 33, 40 and 43 are connected to gates of the switching elements 21, 24, 31, 34, 41 and 44, respectively. The drive circuits 20, 23, 30, 33, 40 and 43 respectively drive the switching elements 21, 24, 31, 34, 41 and 44 in response to control signals $U_P$, $U_N$, $V_P$, $V_N$, $W_P$ and $W_N$, respectively.

One end and the other end of the capacitor 12 are respectively connected to the higher potential source line PP and the lower potential source line NN outside the inverter 5. The capacitor 12 functions to hold a DC source voltage supplied to the inverter 5 at a constant level by means of its capacitance $C_{DC}$. The higher potential source lines PP disposed outside and inside the inverter 5 are connected with each other through a source input terminal P. The lower potential source lines NN disposed outside and inside the inverter 5 are connected with each other through a source input terminal N.

One end of the switch 11 is connected to the higher potential source line PP, and the other end is connected to the main power source 10. The main power source 10 supplies the inverter 5 with a DC main power source voltage $V_{DC1}$ through the higher and lower potential source lines PP, NN. The switch 11 is structured as a relay. The switch 11 functions as a main switch that turns ON when the power conversion device 401 starts the normal operation and turns OFF when stops the same, on the basis of a control signal $Rel_1$, transmitted by the initial charge controller unit 70.

The initial charging circuit 6 functions as a charge-pump for charging the capacitor 12 in cooperation with the switching element 24 which repeatedly turns ON and OFF on the basis of control by the initial charge controller unit 70, during an initial charging period i.e. a period when the initial charging operation is performed. For this purpose, the initial charging circuit 6 comprises a DC power source 16, a switch 18 and a diode 19 which are connected in series with one another. One end of the initial charging circuit 6 is connected to one of the output terminals U, V and W (hereinafter, supposed to be the terminal V), and the other end is connected to the lower potential source line NN.

The DC power source 16 is prepared as an auxiliary power source having a lower output voltage and a higher output impedance than the main power source 10. For example, the DC power source 16 is formed as a switching power source which converts a DC source voltage $V_{DC2}$ supplied by an external DC power source 15 into a DC voltage $V_{DC3}$ and output the same, i.e. a converter as FIG. 1 shows.

Switch 18 is structured as a relay. The switch 18, being controlled by the control signal $Rel_2$ tranmitted by the initial charge controller unit 70, is set ON when the power conversion device 401 performs the initial charging operation and turns OFF when the normal operation is started.

The diode 19 functions as a blocking diode that protects the switch 18 structured as a low-voltage relay and the DC power source 16 from a high voltage during the normal operation. The direction of the diode 19 is so adjusted that a charging current $I_{CHG}$ that is a current flowing through the initial charging circuit 6 charges the capacitor 12 by charge-pumping function. In an example shown in FIG. 1, the direction is so adjusted that a forward current of the diode 19 flows from the DC power source 16 to the output terminal V.

The main controller unit 200, after the initial charging operation for charging the capacitor 12 is completed, transmits the control signals $U_P$, $U_N$, $V_P$, $V_N$, $W_P$ and $W_N$ to the drive circuits 20, 23, 30, 33, 40 and 43, respectively so as to control the switching elements 21, 24, 31, 34, 41 and 44 to selectively and repeatedly turn ON and OFF. Thus, the normal operation is performed, and power is supplied from the main power source 10 to the inductive load 50 through the inverter 5.

The main controller unit 200, for example, comprises a CPU operating on the basis of a program and a memory storing the program. In this configuration, the CPU operates on the basis of the program stored in the memory to thereby calculate the control signals $U_P$, $U_N$, $V_P$, $V_N$, $W_P$ and $W_N$.

The initial charge controller unit 70 controls a switching element (hereinafter, supposed to be the switching element 24) other than those switching elements connected to the output terminal (already supposed to be the output terminal V) connected to the initial charging circuit 6, and switches 11, 18 during the initial charging period. The control signal $U_N$ is transmitted to the drive circuit 23, and thereby the initial switching element 24 is controlled.

The initial charge controller unit 70 performs the control on the basis of the charged voltage $V_{DC}$ across the capacitor 12 and the charging current $I_{CHG}$ flowing through the initial charging circuit 6. For this purpose, the power conversion device 401 comprises a charged voltage detection circuit detecting the charged voltage $V_{DC}$ and a charging current detecting circuit detecting the charging current $I_{CHG}$.

In an example shown in FIG. 1, the charged voltage detection circuit comprises the resistors 13 and 14. One end of the resistor 13 is connected to the higher potential source line PP. One end of the resistor 14 is connected to the other end of the resistor 13, and the other end thereof is connected to the lower potential source line NN. The voltage at a connection between the resistors 13 and 14 is output as a detection voltage $V_{DC4}$. Thus, the detection voltage $V_{DC4}$ is obtained by dividing the main power source voltage $V_{DC1}$ by resistances R1 and R2 of the resistors 13 and 14.

In the example of FIG. 1, the charging current detection circuit comprises a resistor 17 interposed into a path of the charging current $I_{CHG}$, and thereby outputs the voltage drop across the resistor 17 as the detection voltage $V_{CHG}$. Although the resistor 17 is disposed inside the DC power source 16 in the example of FIG. 1, the resistor 17 may be interposed into some other portion in the path of the charging current $I_{CHG}$, such as inside the inductive load 50. The initial charge controller unit 70 receives the detection voltages $V_{DC4}$ and $V_{CHG}$, and thereby performs the control based on the charged voltage $V_{DC}$ and the charging current $I_{CHG}$.

1.2. Operation of Device

Now, description will be given on the initial charging operation of the power conversion device 401. During the initial charging period, the main controller unit 200 controls all the switching elements 21, 24, 31, 34, 41 and 44 to remain OFF. After the initial charge controller unit 70 starts operation, however, only the switching element 24 operates on the basis of the control by the initial charge controller unit 70 in preference to the control by the main controller unit 200.

Figure 2:
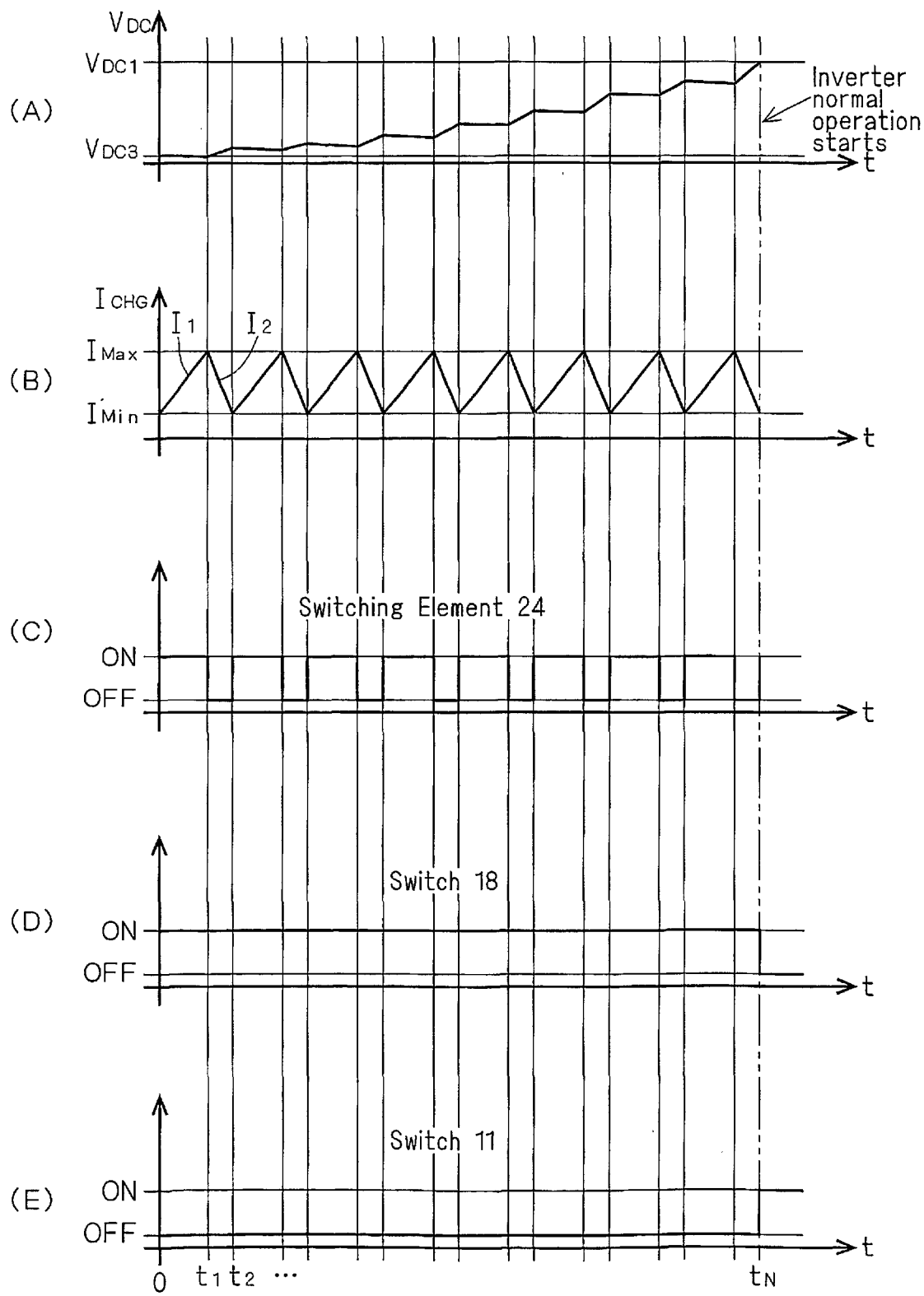
FIG. 2 is a timing chart showing an operation of the power conversion device of FIG. 1.

FIG. 2 is a timing chart showing the initial charging operation performed on the basis of the initial charge controller unit 70. The initial charge controller unit 70 transmits the control signals $Rel_1$ and $Rel_2$ so as to keep the switch 11 OFF and the switch 18 ON as long as the charged voltage $V_{DC}$ across the capacitor 12 is lower than a predefined reference voltage (see (D) and (E) of FIG. 2). Accordingly, the switch 11 is set OFF and the switch 18 is set ON initially after the initial charge controller unit 70 starts its operation.

The charged voltage $V_{DC}$ gradually increases from zero to the DC voltage $V_{DC3}$ output by the DC power supply 16 because the capacitor 12 is charged by the charging current $I_{CHG}$ flowing from the DC current power source 16 through the switch 18, the diode 19, and the freewheeling diode 32.

As mentioned above, the DC voltage $V_{DC3}$ is set sufficiently lower than the main power source voltage $V_{DC1}$, and the output impedance of the DC power source 16 is set sufficiently higher than that of the main power source 10. In particular, when the DC power source 16 is configured as a switching power source, the internal impedance thereof can easily set high.

Therefore, the charging current $I_{CHG}$ is limited to such a small value as not to burden the DC power source 16 with a heavy load. The contact resistance of the switch 18, the on-resistance of the diode 19, and the on-resistance of the freewheeling diode 32 also contribute to limitation of the charging current $I_{CHG}$.

As the charged voltage $V_{DC}$ reaches the DC voltage $V_{DC3}$ (at time t=0), the initial charge controller unit 70 transmits the control signal $U_N$ so as to turn ON the switching element 24 (see (C) of FIG. 2). Alternatively, the initial charge controller unit 70 may turn ON the switching element 24 from the beginning without waiting the charged voltage $V_{DC}$ reaching the DC voltage $V_{DC3}$.

Figure 3:
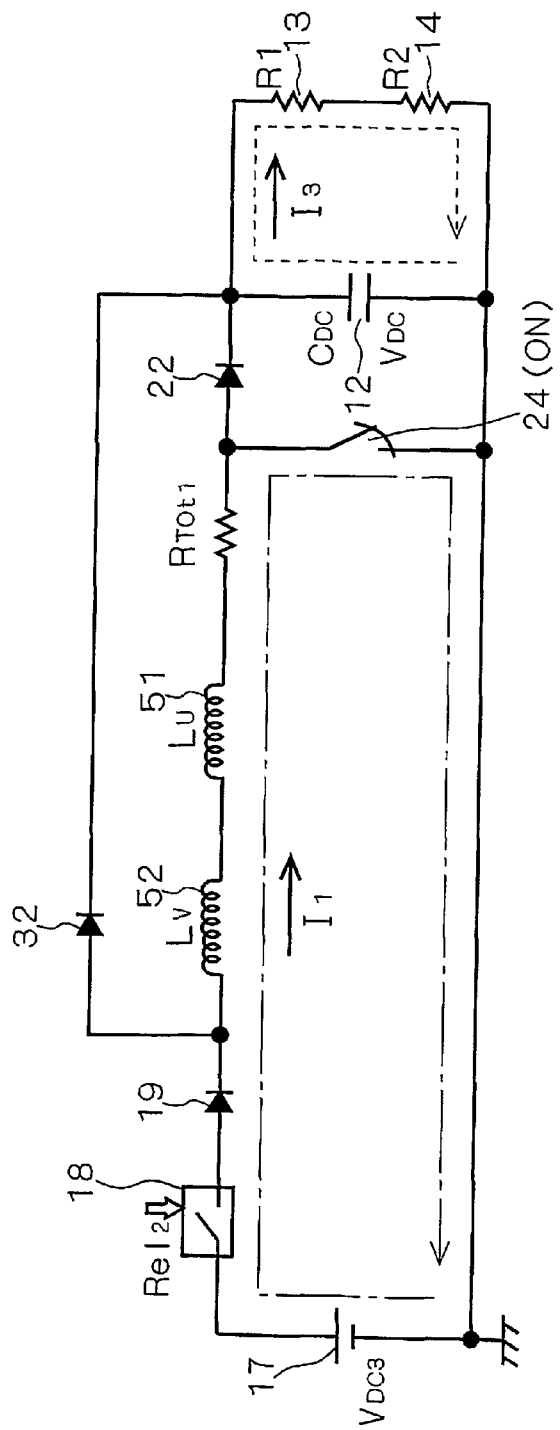
FIGS. 3 and 4 are explanatory drawings showing an operation of the device of FIG. 1.

After the switching element 24 turns ON, the charging current $I_{CHG}$ (denoted by $I_1$) flows through the windings 52 and 51 as can be seen by referring to an equivalent circuit shown in FIG. 3. In FIG. 3, a total resistance $R_{Tot1}$ represents an equivalent total resistance component of the path of the charging current $I_{CHG}$ while the switching element 24 being set ON. The total resistance $R_{Tot1}$ includes the output resistance of the DC power source 16, the on-resistance of the switch 18, the on-resistance of the diode 19, the resistances of the windings 51 and 52 of the inductive load 50, and the on-resistance of the switching element 24.

While the switching element 24 being set ON, the charging current $I_{CHG}$ increases steadily, storing energy in the inductances 52 and 51 of the inductive load 50. When the charging current $I_{CHG}$ exceeds a predefined reference current $I_{Max}$, the initial charge controller unit 70 transmits the control signal $U_N$ to turn OFF the switching element 24 (see (B) and (C) of FIG. 2). The reference current $I_{Max}$ is set not larger than a maximum allowed current charging the capacitor 12.

Figure 4:
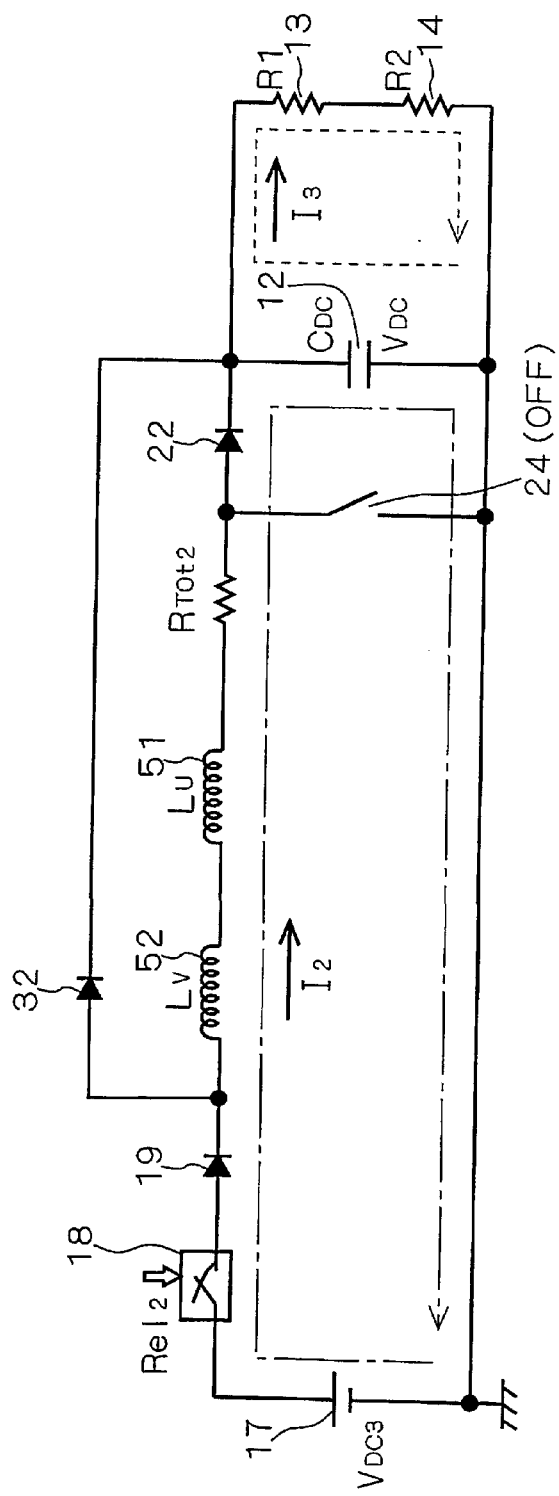

As the switching element 24 turns OFF, the energy stored within the inductances $L_V$ and $L_U$ of the windings 52 and 51 then forces the charging current $I_{CHG}$ (denoted by $I_2$) to flow through the freewheeling diode 22 and thus transferring energy to the capacitor 12 as can be seen by referring to an equivalent circuit shown in FIG. 4. As a result, the capacitor 12 is charged, and therefore, the charged voltage $V_{DC}$ across the capacitor 12 increases as part (A) of FIG. 2 shows. In FIG. 4, a total resistance $R_{Tot2}$ represents an equivalent total resistance component of the path of the charging current $I_{CHG}$ while the switching element 24 being set OFF. The total resistance $R_{Tot2}$ includes the output resistance of the DC power source 16, the on-resistance of the switch 18, the on-resistance of the diode 19, the resistances of the windings 51 and 52 of the inductive load 50, the on-resistance of the freewheeling diode 22, and the internal resistance of the capacitor 12.

While the switching element 24 being set OFF, the charging current $I_{CHG}$ continues to fall (see (B) of FIG. 2). When the charging current $I_{CHG}$ drops below a predefined reference current $I_{Min}$, the initial charge controller unit 70 transmits the control signal $U_N$ to turn ON the switching element 24 (see (B) and (C) of FIG. 2). The reference current $I_{Min}$ is set lower than the reference current $I_{Max}$.

The energy stored within the capacitor 12 will not discharge through the switching element 24 even when the switching element 24 is set ON, because the freewheeling diodes 22, 32 and 42 are reversely biased. The discharge of energy from the capacitor 12 during the initial charging period results only from a current $I_3$ flowing through the resistors 13 and 14 which is usually negligible because of such high resistances of these resistors as hundreds of kilo-Ohm.

The switching element 24 repeatedly turns ON and OFF (see (B) of FIG. 2). As a result, the charged voltage across the capacitor 12 is gradually stepped up (see (A) of FIG. 2). When the charged voltage $V_{DC}$ reaches the main power source voltage $V_{DC1}$ or a close value thereof, the initial controller unit 70 transmits the control signals $Rel_1$, $Rel_2$ and $U_N$ so as to turn OFF the switch 18 and the switching element 24 and turn ON the switch 11 (see (A) to (E) of FIG. 2). Thus, the initial charging operation is completed, and the normal operation is started. Whether the charged voltage $V_{DC}$ reaches the main power source voltage $V_{DC1}$ or the close value thereof or not is determined on the basis of whether the charged voltage $V_{DC}$ exceeds the predefined reference voltage or not. Therefore, the reference voltage is set at a value closely representing the main power source voltage $V_{DC1}$.

The time required to finish the initial charging operation depends on various parameters including: the capacitance $C_{DC}$ of the capacitor 12, the inductances $L_U$ and $L_V$ of the inductive load 50, the main power source voltage $V_{DC1}$ of the main power source 10, the DC voltage $V_{DC3}$ of the DC power source 16, the reference currents $I_{Max}$ and $I_{Min}$, and the total resistances $R_{Tot1}$ and $R_{Tot2}$ within the path of the charging current $I_{CHG}$.

1.3. First Exemplary Structure of Initial Charge Controller Unit 70

Figure 5:
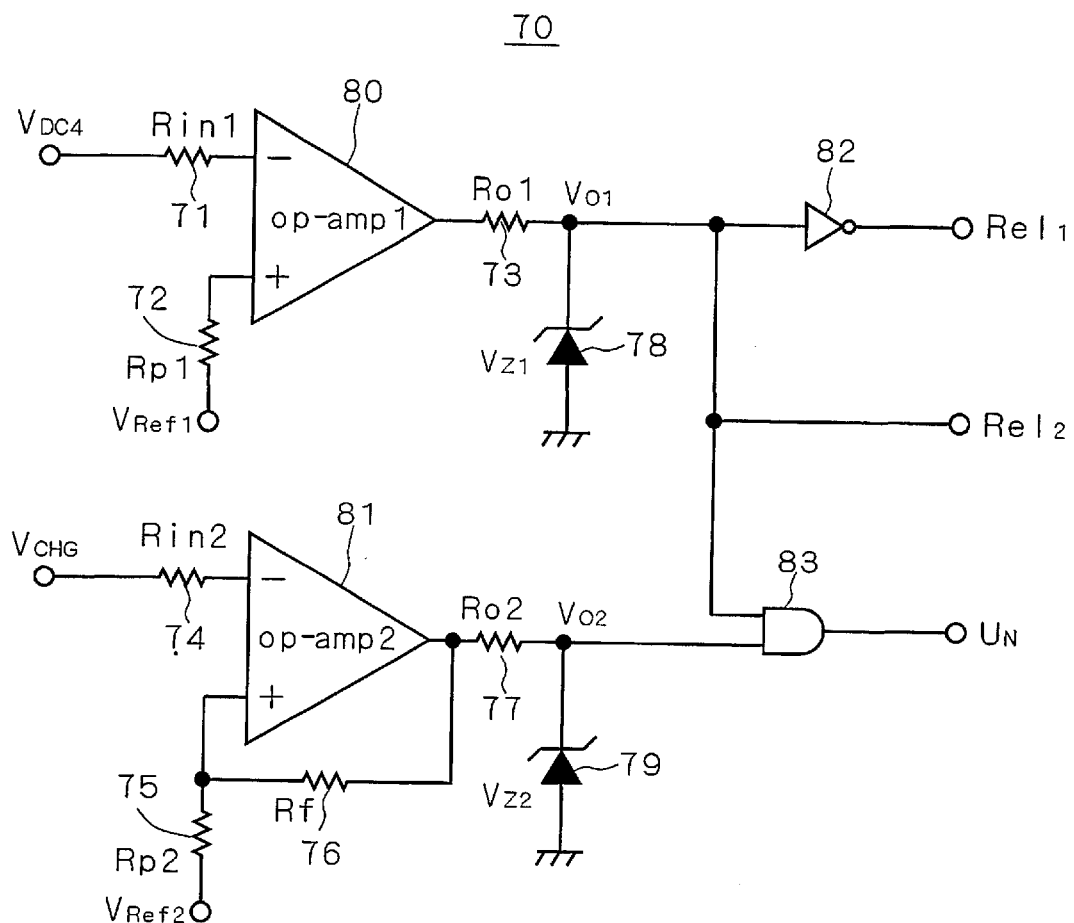
FIG. 5 is a circuit diagram showing an exemplary structure of the initial charge controller unit of FIG. 1.

FIG. 5 is a circuit diagram showing an exemplary structure of the initial charge controller unit 70 formed only of a hardware including an analogue circuit as a main portion thereof. In FIG. 5, the initial charge controller unit 70 forms a comparator and a hysteresis-level detector using operational amplifiers 80 and 81 of two-input type. The operational amplifier 80 receives the detection. voltage $V_{DC4}$ at its reverse input through a resistor 71 having a resistance Rin1, and receives the reference voltage $V_{Ref1}$ at its non-reverse input through a resistor 72 having a resistance Rp1. Therefore, the operational amplifier 80 functions as a comparator which compares the detection voltage $V_{DC4}$ and the reference voltage $V_{Ref1}$.

Figure 6:
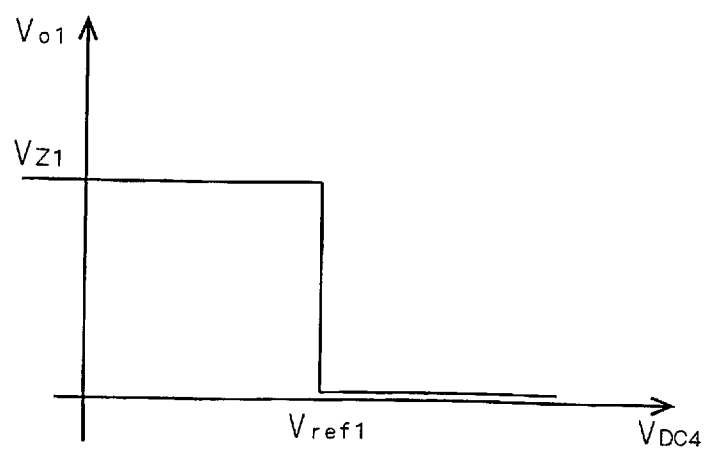
FIGS. 6 and 7 are graphs showing an operation of the initial charge controller unit of FIG. 5.

The output voltage of the operational amplifier 80 is adjusted by a resistor 73 having a resistance Ro1 and a Zener diode 78 having a Zener voltage $V_{z1}$. The relation between an adjusted output voltage Vo1 and the detection voltage $V_{DC4}$ is shown in a graph of FIG. 6. The reference voltage $V_{Ref1}$ is set at such a level that the detection voltage $V_{DC4}$ reaches the reference voltage $V_{Ref1}$ as the charged voltage $V_{DC}$ reaches a reference voltage which allows the initial charging operation to be finished.

Referring again to FIG. 5, the output voltage Vo1 is transmitted to the switch 18 as the control signal $Rel_2$ and to the switch 11 through a logical inverter 82 as the control signal $Rel_1$. Further, the output voltage Vo1 is input to one input of a logic AND 83.

The operational amplifier 81 receives the detection voltage $V_{CHG}$ at its reverse input through a resistor 74 having a resistance Rin2, and receives the reference voltage $V_{Ref2}$ at its non-reverse input through a resistor 75 having a resistance Rp2. The output of the operational amplifier 81 is positively fed back through a resistor 76 having a resistance Rf. Therefore, the operational amplifier 81 functions as a hysteresis-level detector which compares the detection voltage $V_{CHG}$ and the reference voltage $V_{Ref2}$ with hysteresis dependency.

Figure 7:
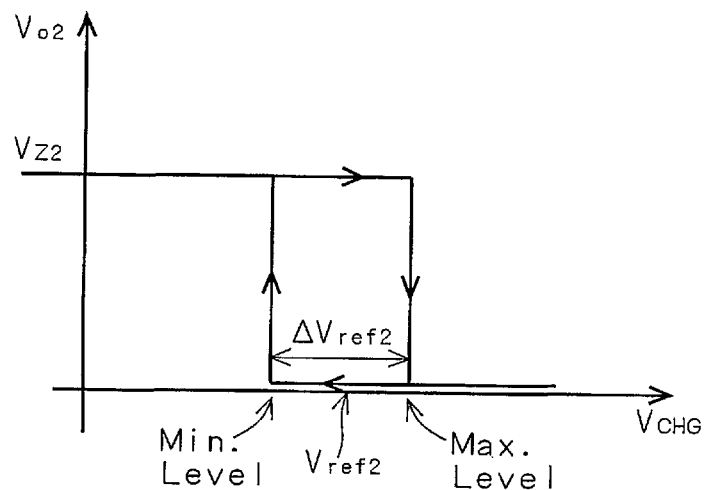

The output voltage of the operational amplifier 81 is adjusted by a resistor 77 having a resistance Ro2 and a Zener diode 79 having a Zener voltage $V_{z2}$. The relation between an adjusted output voltage Vo2 and the detection voltage $V_{CHG}$ is shown in a graph of FIG. 7. The reference voltage $V_{Ref2}$ is set at such a level that the detection voltage $V_{CHG}$ reaches the Max. Level of FIG. 7 as the charging current $I_{CHG}$ reaches the reference current $I_{Max}$ and that the detection voltage $V_{CHG}$ reaches the Min. Level of FIG. 7 as the charging current $I_{CHG}$ reaches the reference current $I_{Min}$.

Referring again to FIG. 5, the output voltage Vo2 is input to the other input of the logic AND 83. The output voltage of the logic AND 83 is transmitted to the drive circuit 23 as the control signal $U_N$. The logic AND 83 functions as a logic switch that transmits the output voltage Vo2 to the drive circuit 23 as the control signal $U_N$ only when the output voltage Vo1 is at high level.

1.4. Second Exemplary Structure of Initial Charge Controller Unit 70

Figure 8:
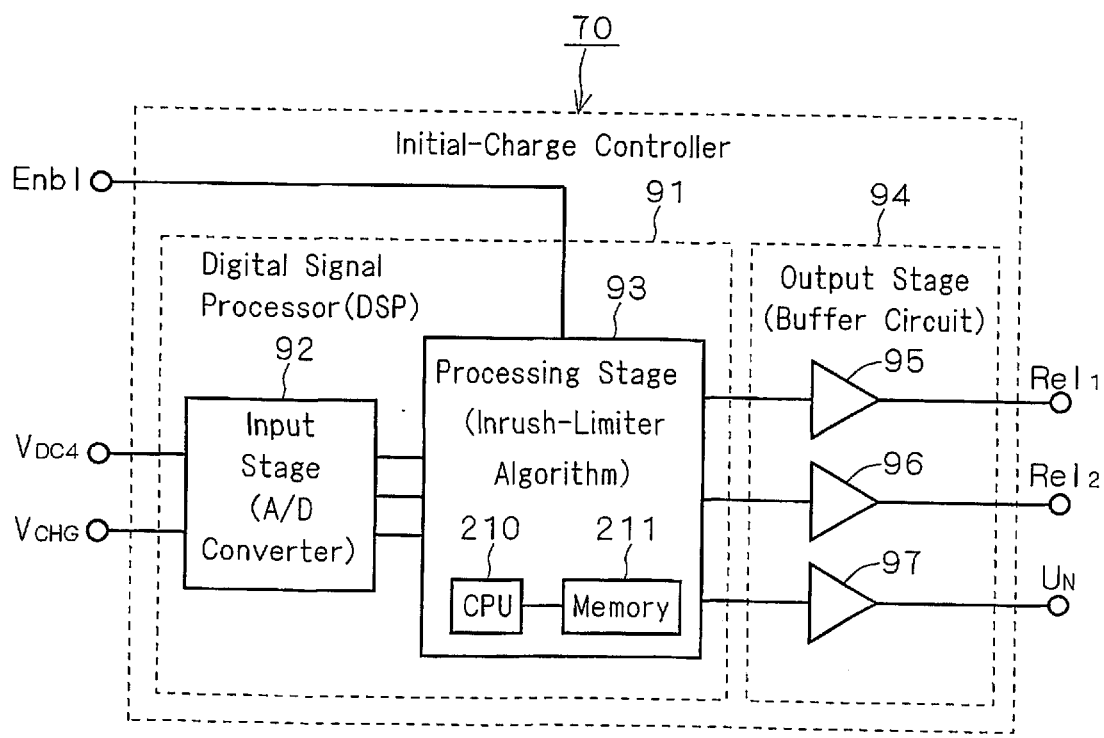
FIG. 8 is a circuit diagram showing another exemplary structure of the initial charge controller unit of FIG. 1.

The initial charge controller unit 70 can also be implemented following a digital approach and using a software control algorithm. FIG. 8 shows another exemplary structure of the initial charge controller unit 70 which uses DSP (Digital Signal Processor) 91. An A/D converter 92 provided at an input stage converts the detection voltages $V_{DC4}$ and $V_{CHG}$ from analogue form to digital form.

A processing unit 93 executes a digital operation processing on the basis of the detection voltages $V_{DC4}$ and $V_{CHG}$ having digital form to thereby calculate control signals $Rel_1$, $Rel_2$ and $U_N$ which control the switch 11, the switch 18 and the switching element 24. A buffer circuit 94 provided at an output stage amplifies the control signals $Rel_1$, $Rel_2$ and $U_N$ through buffers 95, 96 and 97 to thereby transmit the same to the switch 11, the switch 18 and the drive circuit 23, respectively.

Figure 9:
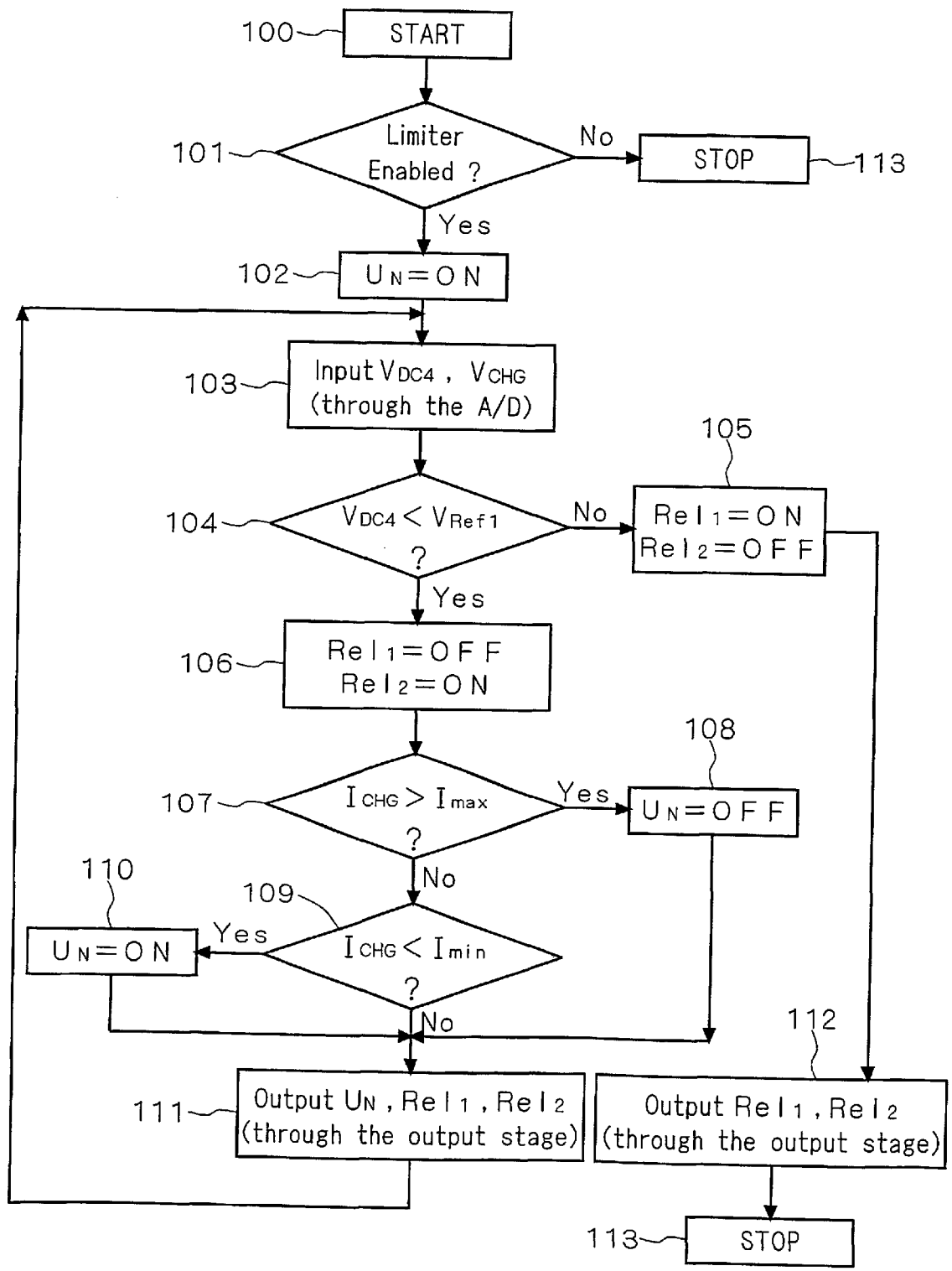
FIG. 9 is a flow chart showing an operation of the initial charge controller unit of FIG. 8.

The processing unit 93 comprises a CPU 210 operating on the basis of a program and a memory 211 storing the program. The CPU 210 operates on the basis of the program stored in the memory 211 to thereby calculate the control signals $Rel_1$, $Rel_2$ and $U_N$. The processing procedure of the processing unit 93 is shown in a flow chart of FIG. 9.

As starting the processing (at step 100), the processing unit 93 checks on the basis of an enable signal Enbl (see FIG. 8) whether the initial charging operation should be started or not (in other words, whether the capacitor 12 has already been charged or the inverter 5 is already running or not). The enable signal Enbl is transmitted from the main controller unit 200. If the enable signal Enbl does not instructs the initial charging operation, the procedure simply stops execution (at step 113), otherwise it continues execution by setting the control signal $U_N$ at such a value as to force the switching element 24 ON (at step 102).

Next, the detection voltages $V_{DC4}$ and $V_{CHG}$ are input (at step 103). Subsequently, the detection voltage $V_{DC4}$ is compared with the reference voltage $V_{Ref1}$ (at step 104). If the detection voltage $V_{DC4}$ has not reached the reference voltage $V_{Ref1}$, the control signal $Rel_1$ is set at such a value as to force the switch 11 OFF, and the control signal $Rel_2$ is set at such a value as to force the switch 18 ON (at step 106). Otherwise, the control signal $Rel_1$ is set at such a value as to force the switch 11 ON, the control signal $Rel_2$ is set at such a value as to force the switch 18 OFF (at step 105), and the procedure stops execution (at step 113) after the control signals $Rel_1$ and $Rel_2$ are output (at step 112).

After the step 106, the processing unit 93 checks whether the charging current $I_{CHG}$ has exceeded the reference current $I_{Max}$ or not (at step 107). If the charging current $I_{CHG}$ is larger than the reference current $I_{Max}$, then the control signal $U_N$ is set at such a value to turn OFF the switching element 24 (at step 108), and the procedure returns to the step 103 after the control signals $Rel_1$, $Rel_2$ and $U_N$ are output (at step 111).

If the outcome of the step 107 is false (i.e. the charging current $I_{CHG}$ is not larger than the reference current $I_{MAX}$), then it is checked whether the charging current $I_{CHG}$ has dropped below the reference current $I_{Min}$ or not (at step 109). If the charging current $I_{CHG}$ is smaller than the reference current $I_{Min}$, the control signal $U_N$ is set at such a value as to turn ON the switching element 24 (at step 110). If the outcome of the step 109 is false (i.e. the charging current $I_{CHG}$ is not smaller than the reference current $I_{Min}$) or the step 110 is completed, then the procedure returns to the step 103 after the control signals $Rel_1$, $Rel_2$ and $U_N$ are output (at step 111).

Although, FIG. 8 shows an example that the initial charge controller unit 70 comprises DSP 91 and the processing unit 93 operates on the basis of the program, the DSP 91 can be replaced with the A/D converter 92 and another processing unit 93 formed of a digital circuit operating without any program.

1.5. Corroborating Data

Now, the computer simulation conducted in order to prove the performance of the power conversion device 401 will be described. In the power conversion device 401 prepared for the simulation, the initial charge controller unit 70 is configured as FIG. 8 shows. The circuit parameters used in the simulation are as follows: $V_{DC1}$=288 V; $V_{DC3}$=12 V; $I_{MAX}$=2 A; $I_{Min}$=1.4 A; $L_U=L_V=L_W$=500 μH (inductance of the inductive load 50 per phase); $R_U=R_V=R_W$=10 m Ω (resistance of inductive load 50 per phase); $C_{DC}$=180 μF; ESR=1 m Ω (effective series resistance of capacitor 12); ESL=20 nH (effective series inductance of capacitor 12); $R_1$=400 kΩ; $R_2$=7 kΩ; and on-resistance of switch 18=100 mΩ.

Figure 10:
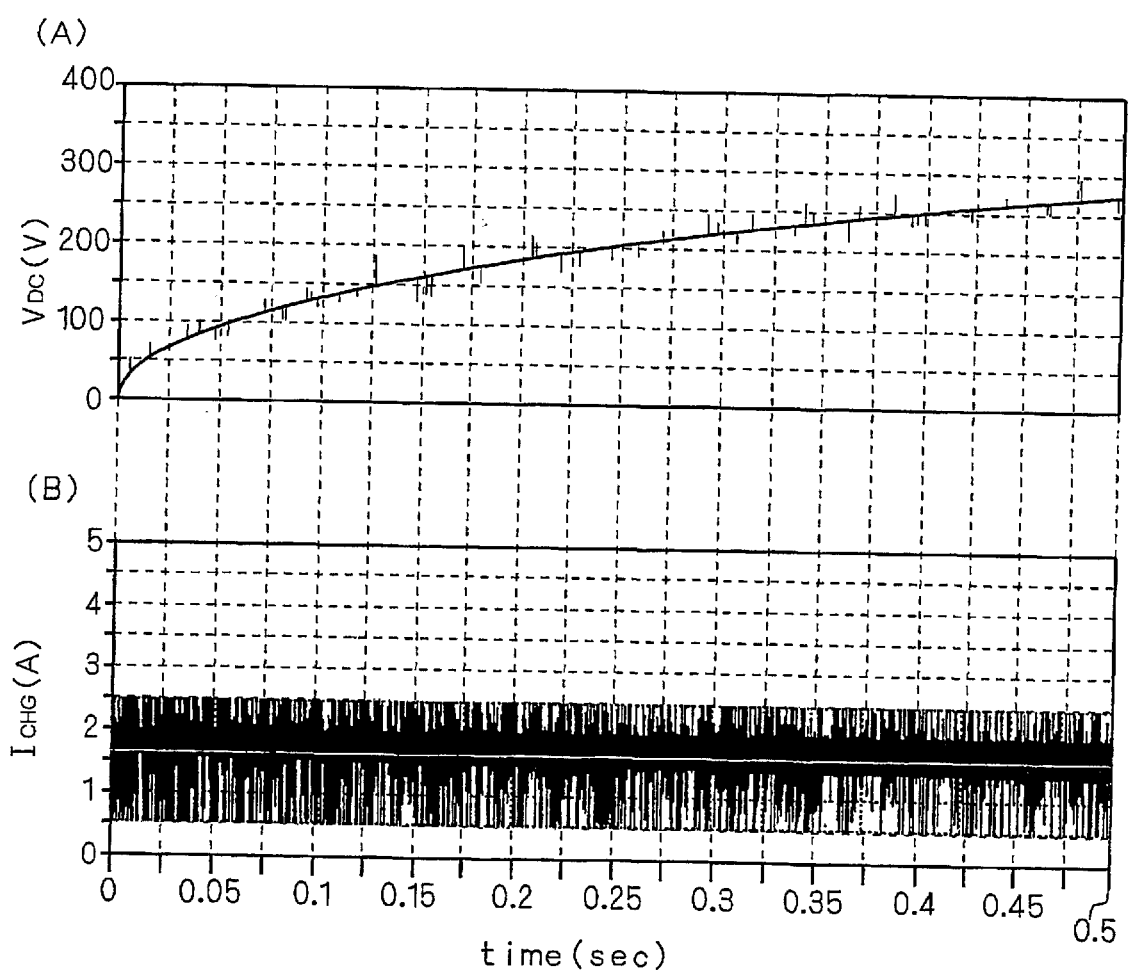
FIGS. 10 and 11 are graphs showing a result of a simulation on the initial charge controller unit of FIG. 1.
Figure 11:
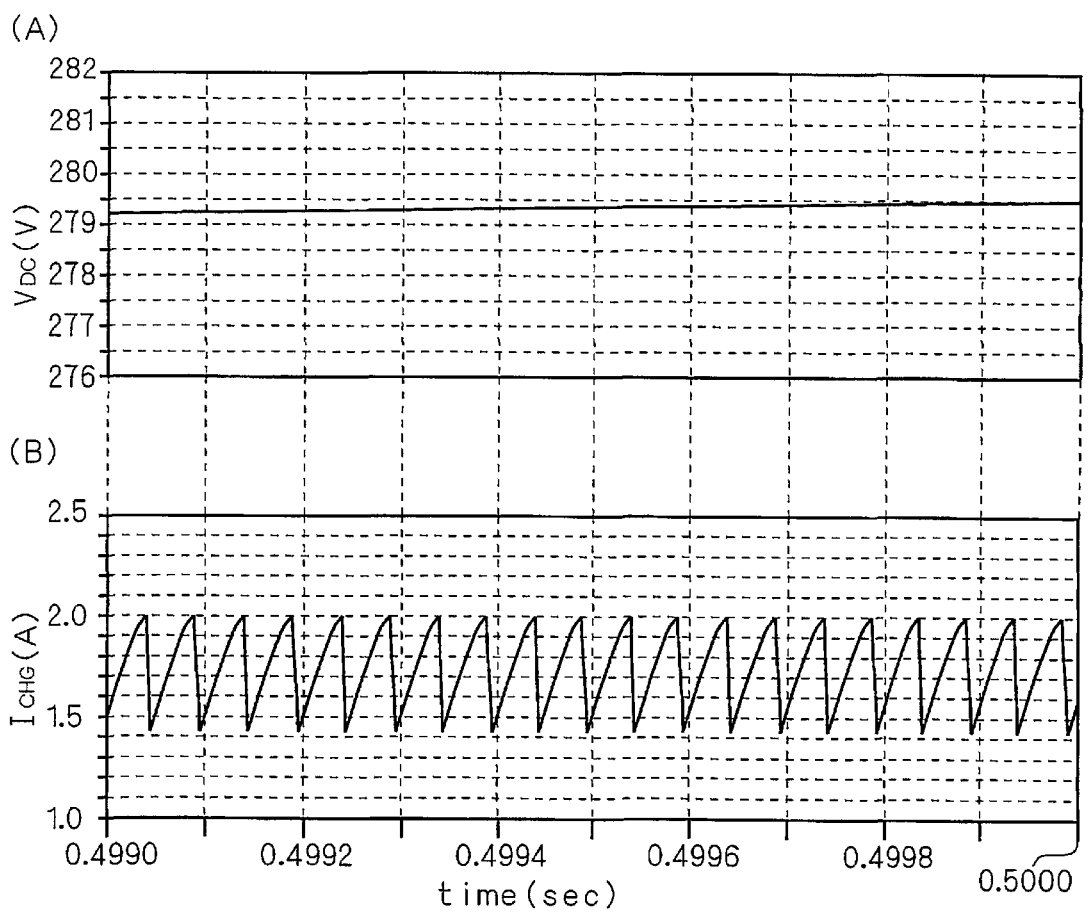

FIGS. 10 and 11 are graphs showing the result of the simulation. FIG. 11 shows final stage of FIG. 10 in detail by enlarging the time scale. The result of the simulation shows that the charged voltage $V_{DC}$ across the capacitor 12 gradually increases after the initial charging operation starts (at time=0), and it reaches the main power source voltage $V_{DC1}$ and the initial charging operation is completed in 0.5 second. Thus, the result of the simulation has proven the successful operation of the power conversion device 401.

1.6. Advantages of Device

In the power conversion device 401, since the capacitor 12 is charged up to a certain voltage level by the charging current $I_{CHG}$ flowing through the initial charging circuit 6 during the initial charging operation prior to the normal operation, an inrush current due to turning-ON of the switch 11 for starting the normal operation is suppressed. Further, since charge-pumping function is utilized, the power resistor 11a and the switch 11b (see FIG. 16) through which a large current supplied by the main power source 10 flows are removed contrary to the first prior art, and a rated current can be set large contrary to the second prior art (see FIG. 17). Moreover, since the switching element 24 and the first freewheeling diode 22 which are indispensable for the normal operation and the inductances $L_U$ and $L_V$ of the inductive load 50 are utilized for performing the charge-pumping function, neither the additional switching element 11e nor inductor 11d (see FIG. 18) is required contrary to the third prior art. Thus, in the power conversion device 401, high reliability is achieved even under large rated current, and the overall weight and volume of the device can be reduced, advantageously.

Further, when the structure of FIG. 5 is applied to the initial charge controller unit 70, the initial charge controller unit 70 is configured simply and lightly, and the manufacturing cost of the device is reduced. When the structure of FIG. 8 is applied to the initial charge controller unit 70, the reference voltage, the reference current, a processing speed and other conditions can be adjusted with high accuracy, and it is easy to adjust or modify these conditions. Accordingly, precise control operation is implemented, and flexible design change suitable for so-called multi-item small-quantity production is facilitated. Furthermore, when the initial charge controller unit 70 comprises the processing unit 93 formed of a digital circuit operating without a program, highly precise control operation with little secular change is implemented.

2. Second Preferred Embodiment

Figure 12:
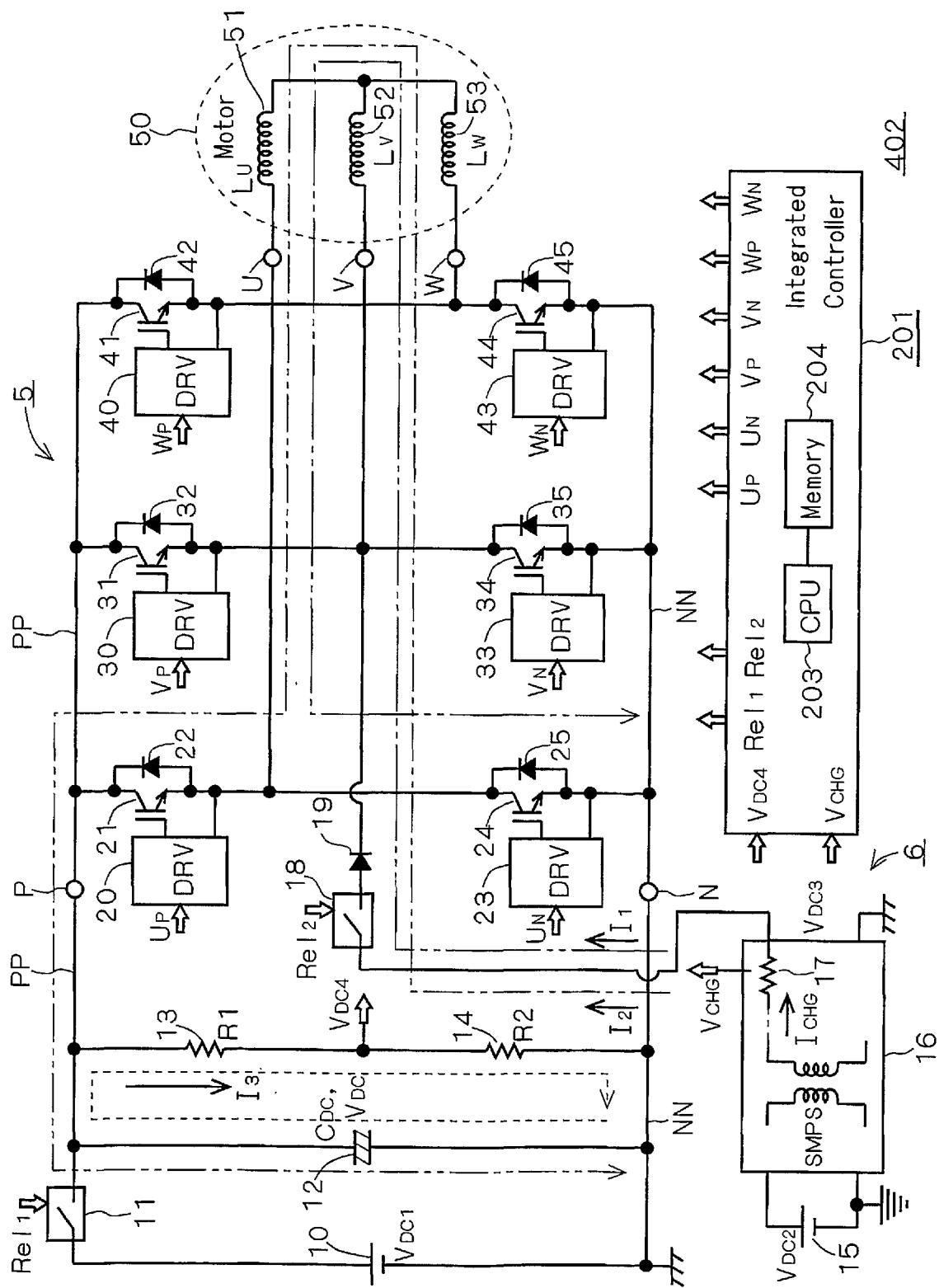
FIG. 12 is a circuit diagram showing a structure of a power conversion device according to a second preferred embodiment of the present invention.

FIG. 12 is a circuit diagram showing a structure of a power conversion device according to the second preferred embodiment of the present invention. This power conversion device 402 is characteristically different from the power conversion device 401 according to the first preferred embodiment in that the initial charge controller unit 70 and the main controller unit 200 are integrated into single integrated controller unit 201. The integrated controller unit 201 comprises a CPU 203 and a memory 204 storing a program that instructs the operation of the CPU 203. The CPU 203 operates on the basis of the program stored in the memory 204 so that both the control operations by the initial charge controller unit 70 and the main controller unit 200 are implemented. In the power conversion device 402, therefore further reduction in weight, volume and cost of the device is achieved.

3. Third Preferred Embodiment

Figure 13:
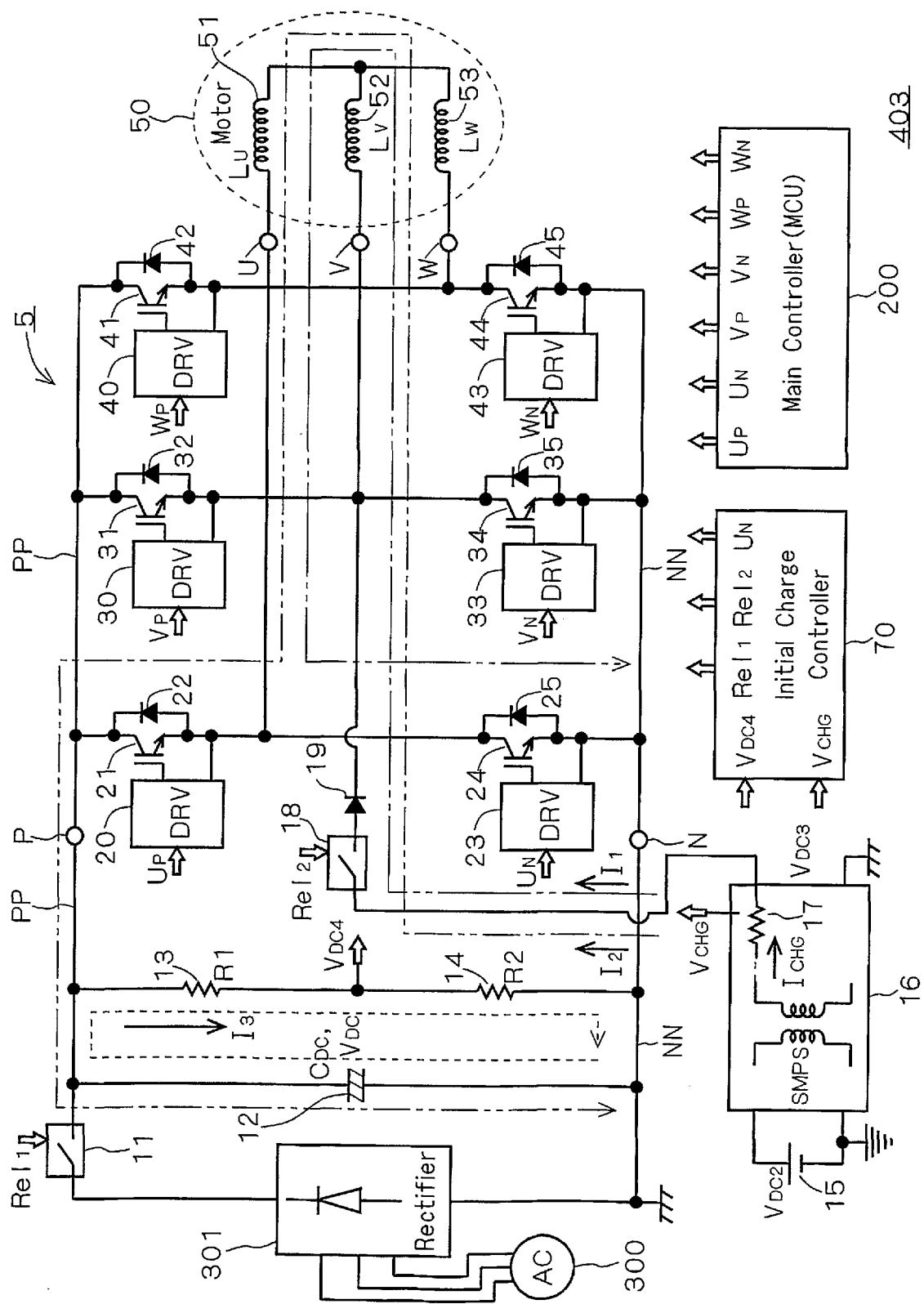
FIG. 13 is a circuit diagram showing a structure of a power conversion device according to a third preferred embodiment of the present invention.

FIG. 13 is a circuit diagram showing a structure of a power conversion device according to the third preferred embodiment of the present invention. This power conversion device 403 is characteristically different from the power conversion device 401 according to the first preferred embodiment in that it comprises a rectifier circuit 301 converting an AC voltage input from an external AC power source 300 into a DC voltage $V_{DC1}$. The rectifier circuit 301 applies the DC voltage $V_{DC1}$ between the lower potential source line NN and the other end of the switch 11. The DC power source 16 is configured as a converter that converts the DC voltage $V_{DC1}$ into another DC voltage $V_{DC3}$.

Accordingly, the power conversion device 403 can be used only by connecting an available AC power source 300 without preparing an external DC power source. Further, since the DC power source 16 is a converter that utilizes the DC voltage $V_{DC1}$ generated by the rectifier circuit 301, the DC power source 16 is configured simply.

4. Fourth Preferred Embodiment

Figure 14:
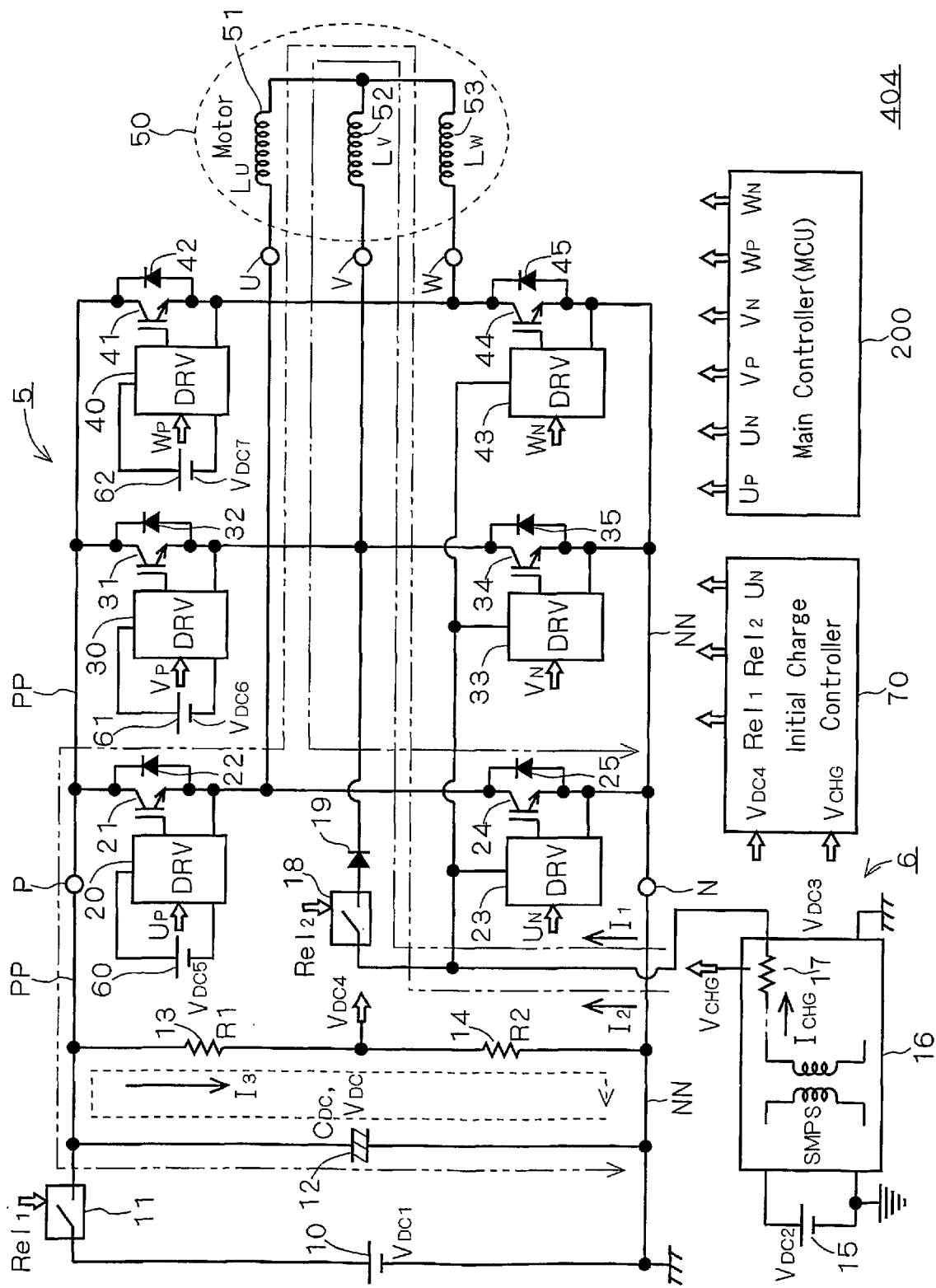
FIG. 14 is a circuit diagram showing a structure of a power conversion device according to a fourth preferred embodiment of the present invention.

FIG. 14 is a circuit diagram showing a structure of a power conversion device according to the fourth preferred embodiment of the present invention. This power conversion device 404 is characteristically different from the power conversion device 401 according to the first preferred embodiment in that source voltages of the drive circuits 23, 33 and 43 are supplied by the DC power source 16. In the power conversion device 404, therefore an additional power source for supplying the drive circuits 23, 33 and 43 with the source voltages is advantageously not needed. Even though the current capability of the DC power source 16 must satisfy the requirements for both the initial charging operation and the operation of the drive circuits 23, 33 and 43, the overall weight and volume and the manufacturing cost of the device are further reduced.

The drive circuits 20, 30 and 40 are supplied with source voltages $V_{DC5}$, $V_{DC6}$ and $V_{DC7}$ by other power sources 60, 61 and 62, respectively. It is obvious that the drive circuits 20, 23, 30, 33, 40 and 43 have to be supplied with source voltages, and therefore, power sources for the drive circuits 20, 23, 30, 33, 40 and 43 are not illustrated in other preferred embodiments.

5. Fifth Preferred Embodiment

Figure 15:
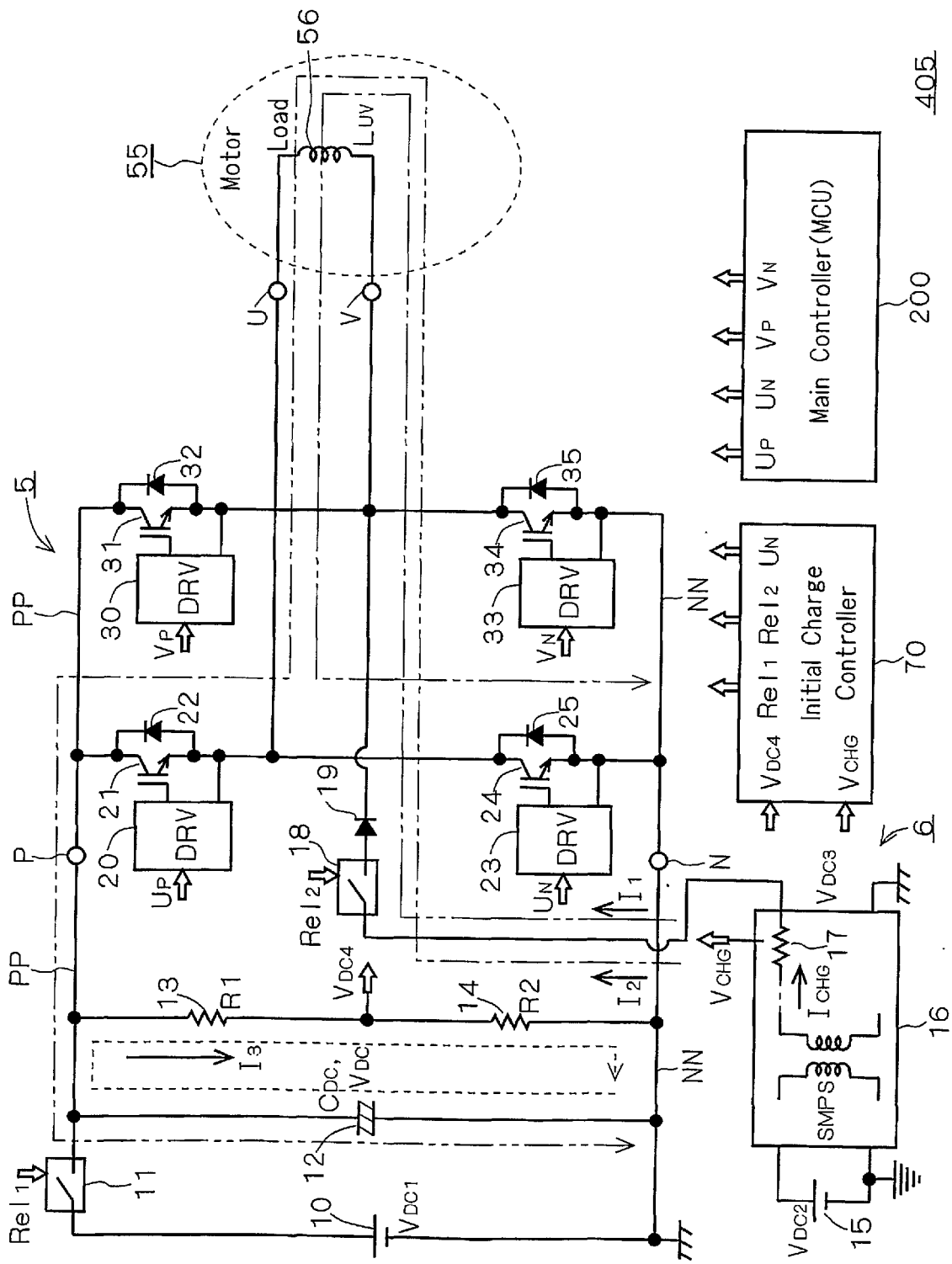
FIG. 15 is a circuit diagram showing a structure of a power conversion device according to a fifth preferred embodiment of the present invention.

FIG. 15 is a circuit diagram showing a structure of a power conversion device according to the fifth preferred embodiment of the present invention. This power conversion device 405 is characteristically different from the power conversion device 401 according to the first preferred embodiment in that the switching elements 41 and 44, the freewheeling diodes 42 and 45, and the drive circuits 40 and 43 are removed. The main controller unit 200 outputs the control signals $U_P$, $U_N$, $V_P$ and $V_N$ only.

The power conversion device 405 is used by connecting a single-phase inductive load 55. In the initial charging operation, an inductance $L_{UV}$ of the winding 56 provided in the inductive load 55 functions in equivalent way to the inductances $L_U$ and $L_V$ in the power conversion device 401 according to the first preferred embodiment. Accordingly, the power conversion device 405 implements the initial charging operation equivalent to that of the power conversion device 401.

6. Modifications

Each of above mentioned preferred embodiments has shown an example that the initial charge controller unit 70 controls the switch 11, the switch 18 and the switching element 24 on the basis of the detection voltage $V_{DC4}$ representing the charged voltage $V_{DC}$ and the detection voltage $V_{CHG}$ representing the charging current $I_{CHG}$. On the contrary, the initial charge controller unit can also be configured to finish the initial charging operation without referring to a signal informing of the charged voltage $V_{DC}$, e.g. to finish the initial charging operation as a predefined initial charging period has been expired after the initial charging operation is started. The initial charge controller unit 70 can also be configured to turn ON and OFF the switching element 24 repeatedly in a predefined period without referring to a signal informing of the charging current $I_{CHG}$.

However, in the power conversion devices according to the above mentioned preferred embodiments, the switching element 24 repeatedly turns ON and OFF so that the charging current $I_{CHG}$ flowing through the initial charging circuit 6 is kept within a certain range.

Accordingly, the capacitor 12 is charged efficiently in a short time. Further, the charging of the capacitor 12 and subsequent move to the normal operation are performed on the basis of the charged voltage $V_{DC}$ across the capacitor 12, and therefore, the inrush current is suppressed, saving time with high reliability.

While the invention has been shown and described in detail, the foregoing description is in all aspects illustrative and not restrictive. It is therefore understood that numerous modifications and variations can be devised without departing from the scope of the invention.

What is claimed is:

1. A power conversion device, comprising:

a first switching element, one main electrode thereof being connected to a first source line;

a first freewheeling diode connected to said first switching element in inverse-parallel;

a second switching element, one main electrode thereof being connected to other main electrode of said first switching element, and other main electrode thereof being connected to a second source line;

a second freewheeling diode connected to said second switching element in inverse-parallel;

a third switching element one main electrode thereof being connected to said first source line;

a third freewheeling diode connected to said third switching element in inverse-parallel;

a fourth switching element, one main electrode thereof being connected to other main electrode of said third switching element, and other main electrode thereof being connected to said second source line;

a fourth freewheeling diode connected to said fourth switching element in inverse-parallel;

a capacitor, one end and other end thereof being connected to said first source line and said second source line, respectively;

a first switch, one end thereof being connected to one source line of a set of said first source line and said second source line;

an initial charging circuit having a DC power source and a second switch connected in series, one end thereof being connected to a connection between said third switching element and said fourth switching element, and other end thereof being connected to said second source line; and an initial charge controller unit controlling said second switch and said second switching element so as to set said second switch ON and repeatedly turn ON and OFF said second switching element while raid first switch is set OFF.

2. The power conversion device according to claim 1, wherein said initial charge controller unit controls said second switching element to turn OFF when a charging current which is a current flowing through said initial charging circuit exceeds a first reference current and turn ON when said charging current drops below a second reference current.

3. The power conversion device according to claim 2, wherein said initial charge controller unit controls said first switch and said second switch so as to set said first switch OFF and set said second switch ON when a charged voltage which is a voltage across said capacitor is lower than a reference voltage, and set said first switch ON and set said second switch OFF when said charged voltage is higher than said reference voltage.

4. The power conversion device according to claim 1, wherein said initial charging circuit further has a diode connected to said DC power source and said second switch in series.

5. The power conversion device according to claim 1, further comprising:

a rectifier circuit converting an AC voltage input from an exterior into a DC voltage and applying said DC voltage between other source line of said set of said first source line and said second source line and other end of said first switch.

6. The power conversion device according to claim 5, wherein
said DC power source is converter converting said DC voltage into another DC voltage.

7. The power conversion device according to claim 1, further comprising:
first to fourth drive circuits respectively connected to control electrodes of said first to fourth switching elements, and respectively driving said first to fourth switching elements in response to first to fourth control signals respectively, wherein
said initial charge controller unit transmits said second control signal to said second drive circuit to thereby control sad second switching element.

8. The power conversion device according to claim 7, wherein
source voltages of said second and fourth drive circuits are supplied by said DC power source.

9. The power conversion device according to claim 3, further comprising:
a charged voltage detection circuit detecting said charged voltage to thereby output a first detection voltage, wherein
said initial charge controller unit receives said first detection voltage to thereby control said first switch and said second switch on a basis of said charged voltage.

10. The power conversion device according to claim 9, wherein
said charged voltage detection circuit comprises:
a first resistor, one end thereof being connected to said first source line; and
a second resistor, one end thereof being connected to other end of said first resistor and other end thereof being connected to said second source line, and outputs a voltage at a connection between said first resistor and said second resistor as said first detection voltage.

11. The power conversion device according to claim 2, further comprising:
a charging current detection circuit detecting said charging current to thereby output a second detection voltage, wherein
said initial charge controller unit receives said second detection voltage to thereby control said second switching element on a basis of said charging current.

12. The power conversion device according to claim 11, wherein
said charging current detection circuit comprises a third resistor interposed into a path of said charging current, and outputs a voltage drop across said third resistor as said second detection voltage.

13. The power conversion device according to claim 3, further comprising:
a charged voltage detection circuit detecting said charged voltage to thereby output a first detection voltage; and
a charging current detection circuit detecting said charging current to thereby output a second detection voltage, wherein
said initial charge controller unit comprises:
an A/D converter converting said first detection voltage and said second detection voltage from analogue form to digital form;

a processing unit executing a digital operation processing on a basis of said first and second detection voltages having digital form to thereby calculate a set of signals which control said first switch, said second switch and said second switching element; and
a buffer circuit amplifying said set of signals to thereby transmit the same to said first switch, said second switch and said second switching element.

14. The power conversion device according to claim 13, wherein
said processing unit comprises:
a CPU operating on a basis of a program; and
a memory storing said program, wherein
said CPU operates on a basis of said program so as to calculate said set of signals.

15. The power conversion device according to claim 3, further comprising:
a charged voltage detection circuit detecting said charged voltage to thereby output a first detection voltage; and
a charging current detection circuit detecting said charging current to thereby output a second detection voltage, wherein
said initial charge controller unit comprises:
a first operational amplifier of two-input type; and
a second operational amplifier of two-input type, wherein
said first operational amplifier receives, at two inputs thereof, said first detection voltage and a first reference voltage and transmits an output signal thereof to said first switch and said second switch so as to set only one of said first switch and said second switch ON, and
said second operational amplifier has a positive feedback loop, receives said second detection voltage at a reverse input thereof, receives a second reference voltage at a non-reverse input thereof and trans its an output signal thereof to said second switching element.

16. The power conversion device according to claim 15, wherein
said initial charge controller unit further comprises a logic switch, and
said logic switch is interposed into a transmission path transmitting said output signal of said second operational amplifier to second switching element, and transmits said output signal of said second operational amplifier to said second switching element only when an output signal of said first operational amplifier is such a value to set said first switch OFF.

17. The power conversion device according to claim 1, wherein
said initial charge controller unit comprises:
a CPU operating on a basis of a program; and
a memory storing said program, wherein
said CPU operates on a basis of said program so as to control said second switch and said second switching element.

18. The power conversion device according to claim 1, further comprising:
a main controller unit controlling said first to fourth switching elements so as to perform a normal operation of s id first to fourth switching elements.

19. The power conversion device according to claim 18, wherein
said initial charge controller unit and said main controller unit are integrated into an integrated controller unit which comprises a CPU operating on a basis of a program and a memory storing said program, wherein said CPU operates on a basis of said program so as to perform both a control of said initial charge controller unit an a control of said main controller unit.

20. The power conversion device according to claim 1, further comprising:

a fifth switching element, one main electrode thereof being connected to said first source line;

a fifth freewheeling diode connected to said fifth switching element in inverse-parallel;

a sixth switching element, one main electrode thereof being connected to other main electrode of said fifth switching element, and other main electrode thereof being connected to said second source line; and a sixth freewheeling diode connected to said sixth switching element in inverse-parallel.

* * * * *

UNITED STATES PATENT AND TRADEMARK OFFICE
CERTIFICATE OF CORRECTION

PATENT NO.    : 6,654,262 B2
DATED         : November 25, 2003
INVENTOR(S)   : Khalid H. Hussein et al.

It is certified that error appears in the above-identified patent and that said Letters Patent is hereby corrected as shown below:

Column 3,
Line 63, change "-transmits" to -- transmits --.

Colum 10,
Line 52, change "tranmitted" to -- transmitted --.

Column 13,
Line 44, delete "." after "detection".

Column 14,
Line 56, change "instructs" to -- instruct --.

Column 18,
Line 38, change "raid" to -- said --

Column 19,
Line 17, change "sad" to -- said --.

Column 20,
Line 36, change "trans its" to -- transmits --;
Line 62, change "s id" to -- said --.

Column 21,
Line 5, change "unit an a control" to -- unit and a control --.

Signed and Sealed this

First Day of June, 2004

JON W. DUDAS
*Acting Director of the United States Patent and Trademark Office*